(12) United States Patent
Iwaizumi

(10) Patent No.: US 10,185,481 B2
(45) Date of Patent: Jan. 22, 2019

(54) ELECTRONIC DEVICE, COMPUTER READABLE MEMORY, AND PROCESS EXECUTION METHOD

(71) Applicant: KYOCERA Corporation, Kyoto-shi, Kyoto (JP)

(72) Inventor: Tomoki Iwaizumi, Hirakata (JP)

(73) Assignee: KYOCERA Corporation, Kyoto (JP)

( * ) Notice: Subject to any disclaimer, the term of this patent is extended or adjusted under 35 U.S.C. 154(b) by 335 days.

(21) Appl. No.: 15/018,742

(22) Filed: Feb. 8, 2016

(65) Prior Publication Data

US 2016/0154571 A1 Jun. 2, 2016

Related U.S. Application Data

(63) Continuation of application No. 13/658,068, filed on Oct. 23, 2012, now abandoned.

(30) Foreign Application Priority Data

Oct. 24, 2011 (JP) .................. 2011-232772

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0412* (2013.01); *G06F 3/0488* (2013.01); *G06F 3/04883* (2013.01)

(58) Field of Classification Search
None
See application file for complete search history.

(56) References Cited

U.S. PATENT DOCUMENTS

2003/0214488 A1 11/2003 Katoh
2005/0105135 A1 5/2005 Takahashi
(Continued)

FOREIGN PATENT DOCUMENTS

JP H09-204426 A 8/1997
JP 2000-047824 A 2/2000
(Continued)

OTHER PUBLICATIONS

Office Action dated Jun. 16, 2015, issued in counterpart Japanese application No. 2011-232772.
(Continued)

*Primary Examiner* — Carl Adams
(74) *Attorney, Agent, or Firm* — Procopio Cory Hargreaves and Savitch LLP

(57) ABSTRACT

A storage part stores therein correspondence table in which a displayed information use process and an execution instruction operation for instructing execution of the displayed information use process are registered in association with each other. When a screen operation identification part identifies that, subsequent to a selection operation for selecting information displayed on a display screen, the execution instruction operation has been performed on the display screen, the process execution part executes the displayed information use process associated with the execution instruction operation in the correspondence table, with use of the information selected by the selection operation.

10 Claims, 30 Drawing Sheets

(51) Int. Cl.
*G06F 3/0488* (2013.01)
*G06F 3/041* (2006.01)

(56) References Cited

U.S. PATENT DOCUMENTS

| | | | |
|---|---|---|---|
| 2007/0247441 A1* | 10/2007 | Kim | G06F 3/04883 345/173 |
| 2010/0122194 A1 | 5/2010 | Rogers | |
| 2011/0050591 A1 | 3/2011 | Kim et al. | |
| 2011/0145768 A1 | 6/2011 | Leffert et al. | |
| 2011/0164281 A1 | 7/2011 | Takahashi | |
| 2011/0205163 A1 | 8/2011 | Hinkley et al. | |
| 2012/0154301 A1* | 6/2012 | Kang | G06F 3/04817 345/173 |
| 2012/0174042 A1* | 7/2012 | Chang | G06F 3/04883 715/863 |
| 2012/0212450 A1 | 8/2012 | Takami | |
| 2013/0067377 A1 | 3/2013 | Rogers | |
| 2013/0104028 A1 | 4/2013 | Murray et al. | |

FOREIGN PATENT DOCUMENTS

| | | |
|---|---|---|
| JP | 2004-170444 A | 6/2004 |
| JP | 2005-148993 A | 6/2005 |
| JP | 2009-294785 A | 12/2009 |
| JP | 2010-244099 A | 10/2010 |
| JP | 2011-090532 A | 5/2011 |
| WO | 2010/056483 A1 | 5/2010 |

OTHER PUBLICATIONS

Office Action dated Mar. 24, 2015, issued in counterpart Japanese application No. 2011-232772.
Office Action dated Jul. 26, 2016, issued in counterpart Japanese application No. 2015-189409.

\* cited by examiner

| EXECUTION INSTRUCTION OPERATION | DISPLAYED INFORMATION USE PROCESS |
|---|---|
| UPPER RIGHT SLIDING OPERATION | COPY |
| DIRECT UPWARD SLIDING OPERATION | DOCUMENT SEARCH |
| UPPER LEFT SLIDING OPERATION | INTERNET SEARCH |
| LOWER LEFT SLIDING OPERATION | DICTIONARY REGISTRATION |
| DIRECT DOWNWARD SLIDING OPERATION | TRANSLATION |
| LOWER RIGHT SLIDING OPERATION | CUT |

F I G. 2 1
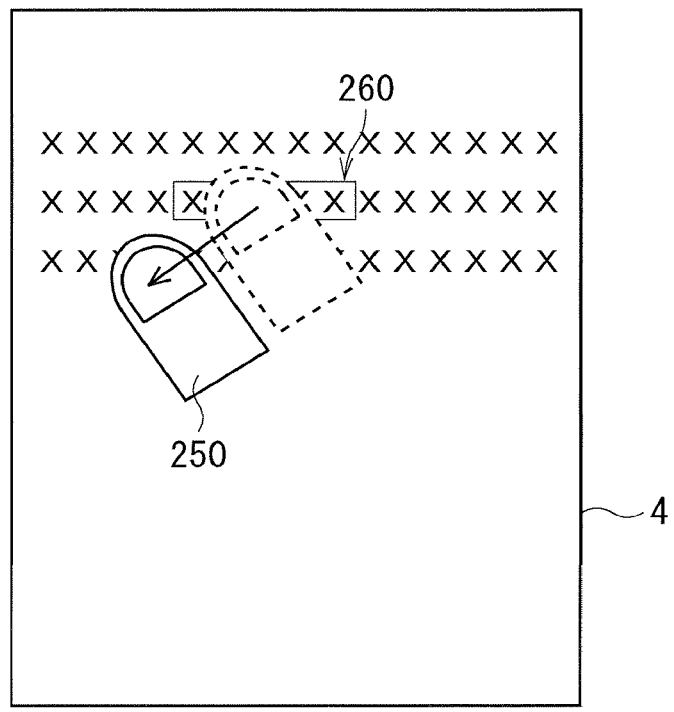
F I G. 2 2
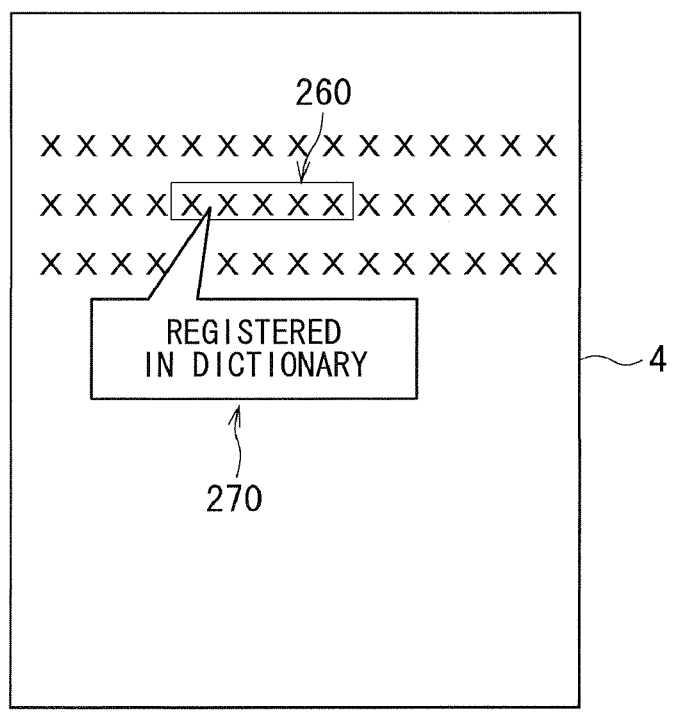

| EXECUTION INSTRUCTION OPERATION | DISPLAYED INFORMATION USE PROCESS |
|---|---|
| UPWARD SLIDING OPERATION | COPY |
| DOWNWARD SLIDING OPERATION | TRANSLATION |

| EXECUTION INSTRUCTION OPERATION | DISPLAYED INFORMATION USE PROCESS |
|---|---|
| LOWER RIGHT SLIDING OPERATION | COPY |
| DIRECT RIGHT SLIDING OPERATION | DOCUMENT SEARCH |
| UPPER RIGHT SLIDING OPERATION | INTERNET SEARCH |
| UPPER LEFT SLIDING OPERATION | DICTIONARY REGISTRATION |
| DIRECT LEFT SLIDING OPERATION | TRANSLATION |
| LOWER LEFT SLIDING OPERATION | CUT |

F I G. 4 3
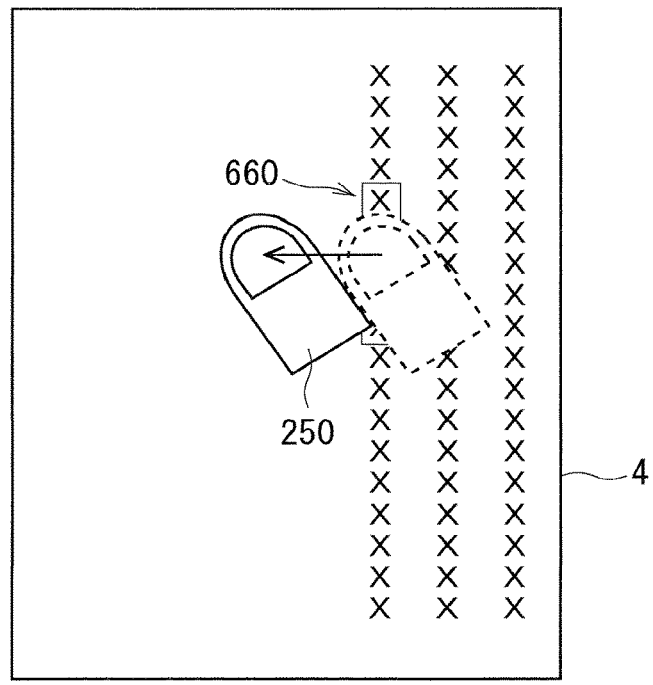
F I G. 4 4
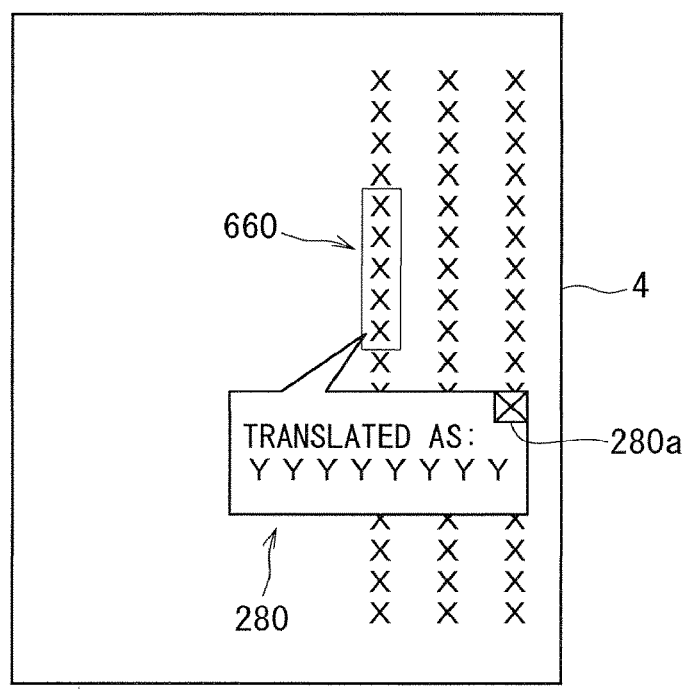

| EXECUTION INSTRUCTION OPERATION | DISPLAYED INFORMATION USE PROCESS |
|---|---|
| RIGHT SLIDING OPERATION | COPY |
| LEFT SLIDING OPERATION | TRANSLATION |

622

F I G . 4 7
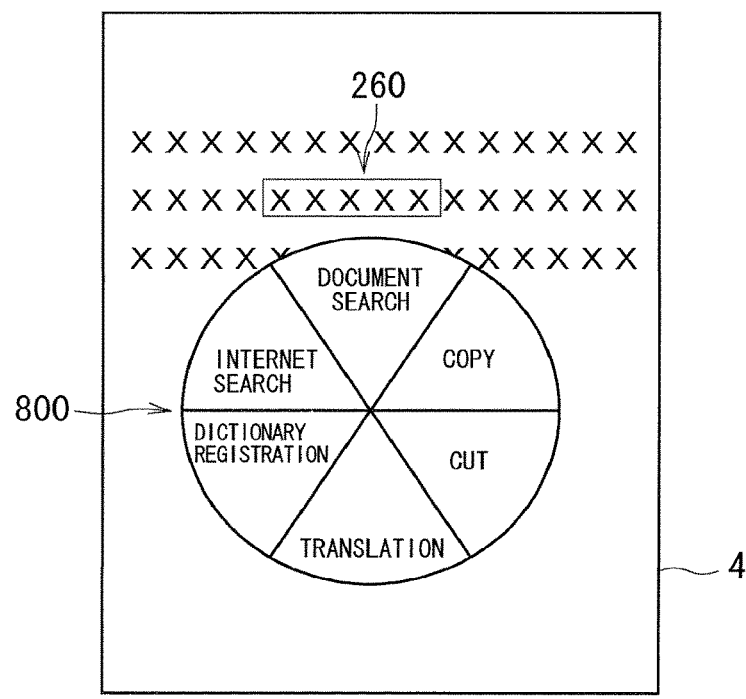
F I G . 4 8
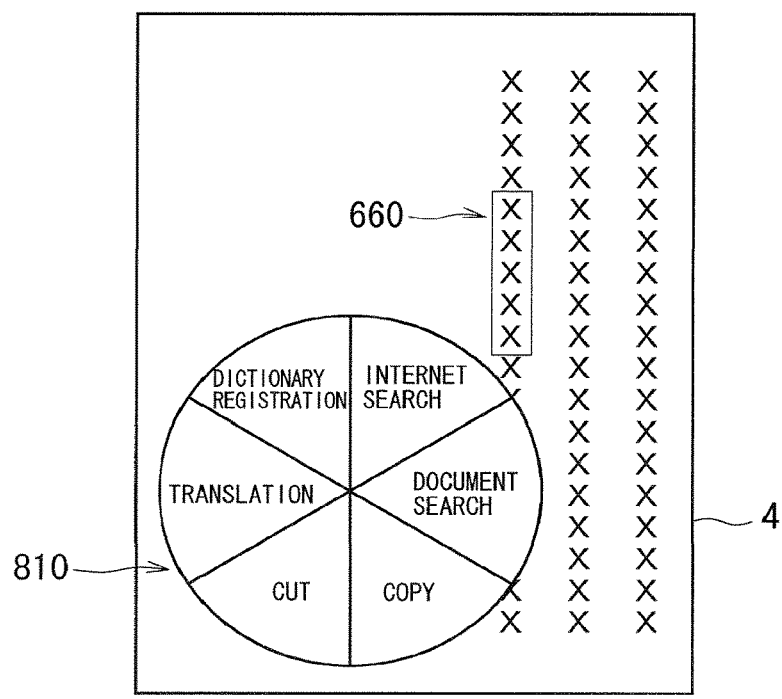

ELECTRONIC DEVICE, COMPUTER READABLE MEMORY, AND PROCESS EXECUTION METHOD

This application is a continuation of U.S. application Ser. No. 13/658,068 filed 23 Oct. 2012 which claims priority to Japanese application No. JP 2011-232772 filed 24 Oct. 2011. The contents of each of these applications are hereby incorporated by reference in their entireties.

BACKGROUND OF THE INVENTION

Field of the Invention

The present invention relates to an electronic device including a display screen configured as a touch panel.

Description of the Background Art

Conventionally, various techniques concerning an electronic device have been proposed. For example, Japanese Patent Application Laid-Open No. 2004-170444 discloses a technique concerning a mobile phone that is one kind of the electronic device.

In the electronic device, an improvement in its operability is demanded.

SUMMARY OF THE INVENTION

An electronic device according to an aspect includes: a display screen configured as a touch panel; a screen operation identification module for identifying an operation performed on the display screen; a process execution module for executing a process in accordance with the operation identified by the screen operation identification module; and a storage module for storing correspondence information in which a process with use of information displayed on the display screen and an execution instruction operation on the display screen for instructing execution of said process are registered in association with each other. When the screen operation identification module identifies that, subsequent to a selection operation for selecting information displayed on the display screen, the execution instruction operation has been performed on the display screen, the process execution module executes the process associated with said execution instruction operation in the correspondence information, with use of the information selected by the selection operation.

A computer readable memory according to an aspect stores therein a control program for controlling an electronic device. The electronic device includes a display screen configured as a touch panel and stores therein correspondence information in which a process with use of information displayed on the display screen and an execution instruction operation on the display screen for instructing execution of said process are registered in association with each other. The control program is configured to cause the electronic device to perform the steps of: (a) identifying an operation performed on the display screen; and (b) upon identification in the step (a) that, subsequent to a selection operation for selecting information displayed on the display screen, the execution instruction operation has been performed on the display screen, executing, with use of the information selected by the selection operation, the process associated with said execution instruction operation in the correspondence information.

A process execution method according to an aspect is a process execution method in an electronic device including a display screen configured as a touch panel and storing therein correspondence information in which a process with use of information displayed on the display screen and an execution instruction operation on the display screen for instructing execution of said process are registered in association with each other. The process execution method includes the steps of: (a) identifying an operation performed on the display screen; and (b) upon identification in the step (a) that, subsequent to a selection operation for selecting information displayed on the display screen, the execution instruction operation has been performed on the display screen, executing, with use of the information selected by the selection operation, the process associated with said execution instruction operation in the correspondence information.

A process execution method according to an aspect is a process execution method in an electronic device including a display screen configured as a touch panel and storing therein correspondence information in which a process with use of information displayed on the display screen and an execution instruction operation on the display screen for instructing execution of said process are registered in association with each other. The process execution method includes the steps of: (a) displaying information on the display screen; (b) identifying that a selection operation for selecting information displayed on the display screen has been performed on the display screen; (c) after identifying the selection operation, identifying that an execution instruction operation has been performed on the display screen; and (d) executing the process associated with the execution instruction operation in the correspondence information, with use of the information selected by the selection operation.

In the above-described aspects, the operability of the electronic device is improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 21 is a diagram showing a situation where the user performs the execution instruction operation;

FIG. 22 is a diagram showing an exemplary display on the display screen after the execution instruction operation is performed;

FIG. 43 is a diagram showing a situation where the user performs the execution instruction operation;

FIG. 44 is a diagram showing an exemplary display on the display screen after the execution instruction operation is performed;

FIG. 47 is a diagram showing a situation where the correspondence table is displayed on the display screen;

FIG. 48 is a diagram showing a situation where the correspondence table is displayed on the display screen;

DESCRIPTION OF THE PREFERRED EMBODIMENTS

Figure 1:
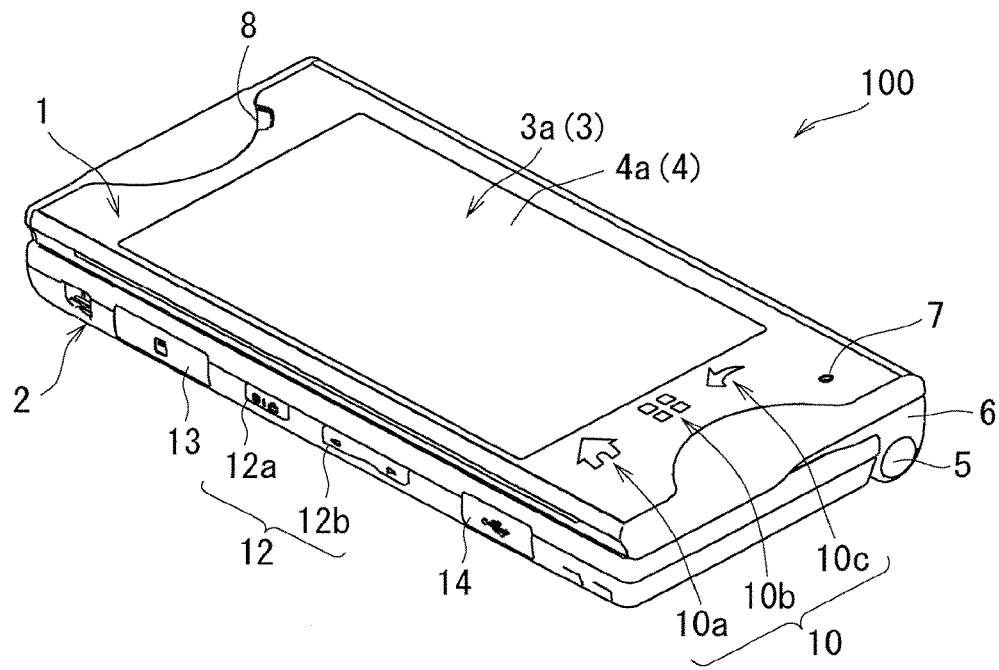
FIG. 1 is a perspective view showing an external appearance of an electronic device in a closed state.
Figure 2:
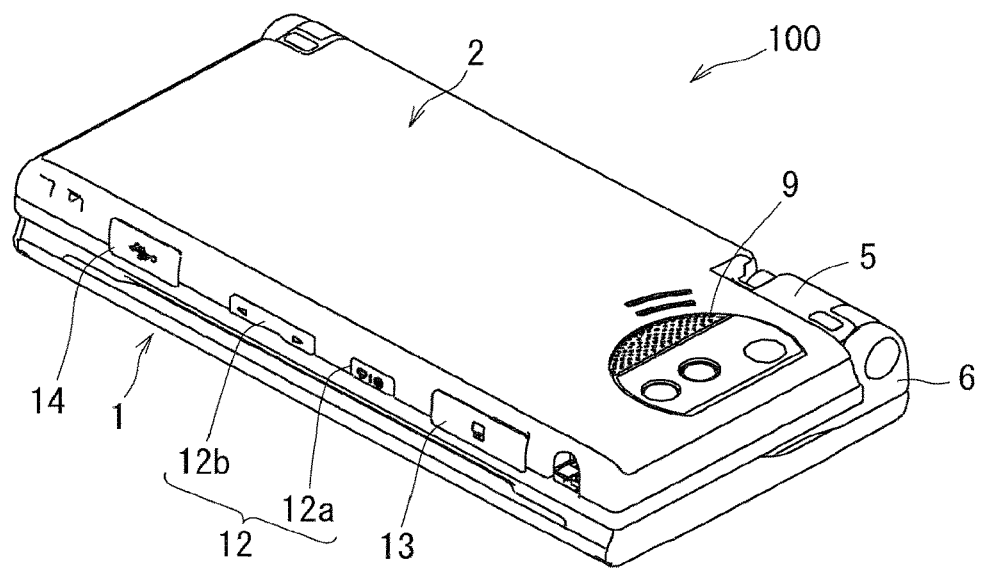
FIG. 2 is a perspective view showing an external appearance of the electronic device in the closed state.
Figure 3:
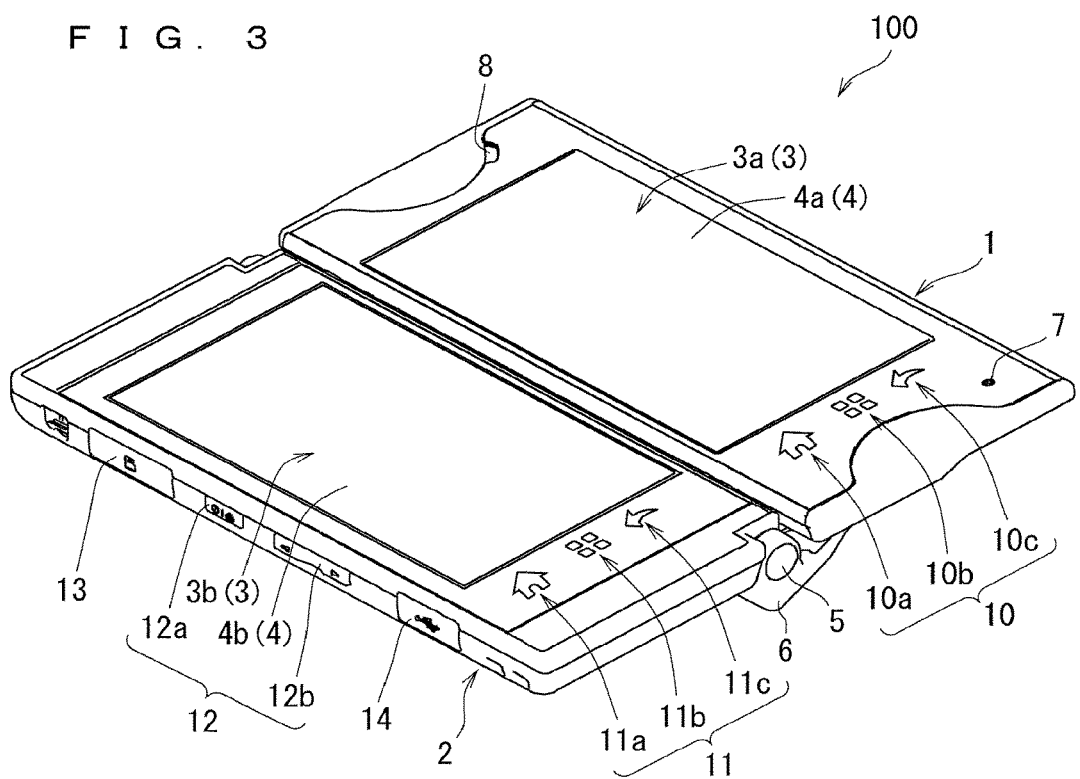
FIG. 3 is a perspective view showing an external appearance of the electronic device in an open state.
Figure 4:
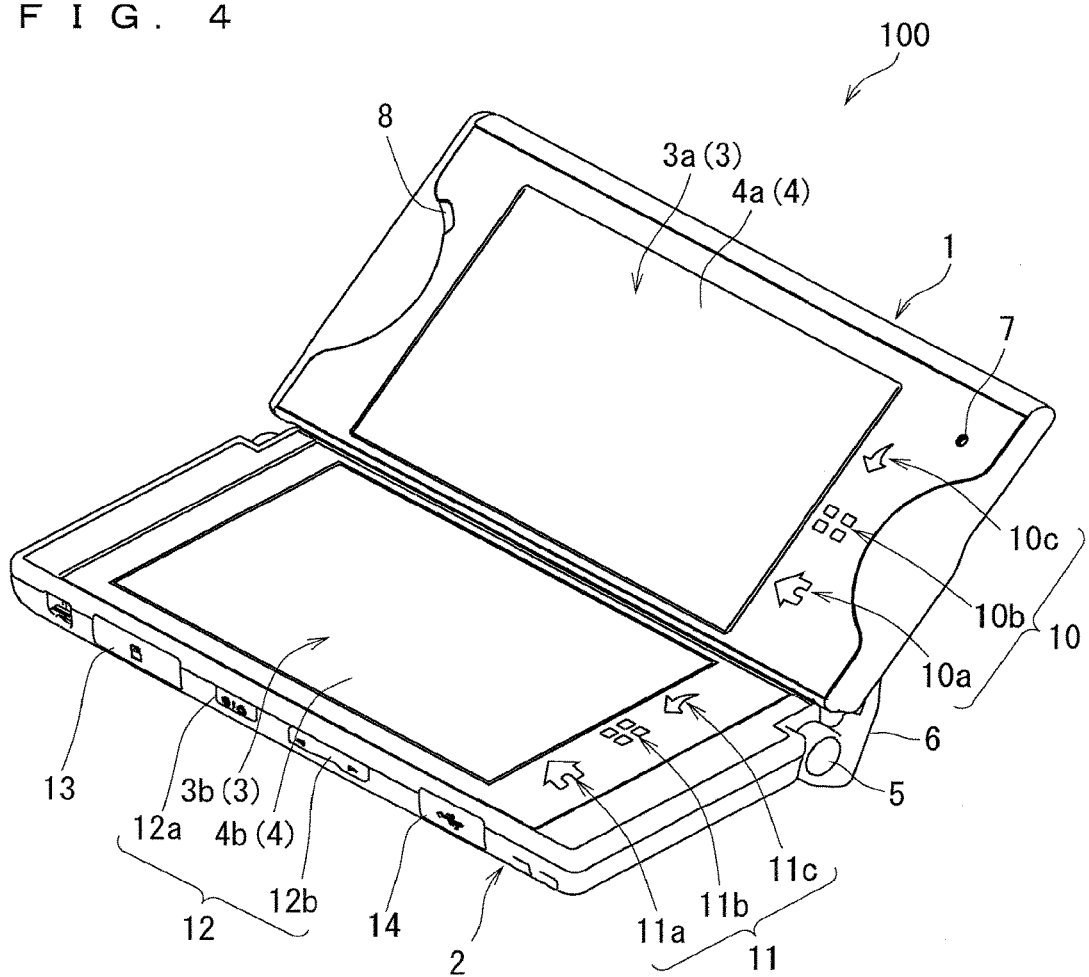
FIG. 4 is a perspective view showing an external appearance of the electronic device in the open state.

FIGS. 1 to 4 are perspective views showing external appearances of an electronic device 100 according to this preferred embodiment. The electronic device 100 is one kind of computer and is, for example, an openable and closable mobile phone. The electronic device 100 includes a first housing 1 and a second housing 2. FIG. 1 shows the electronic device 100 being closed (in a closed state) as seen from the first housing 1 side. FIG. 2 shows the electronic device 100 being closed as seen from the second housing 2 side. FIGS. 3 and 4 show the electronic device 100 being opened (in an open state).

Here, as shown in FIGS. 1 and 2, a state of the electronic device 100 being closed is a state where the first housing 1 and the second housing 2 are arranged so as to overlap each other while a first display screen 4a of a first display part 3a provided in the first housing 1 is exposed. In this case, the first display screen 4a and a second display screen 4b of a second display part 3b provided in the second housing 2 overlap each other with a space therebetween. Therefore, it can be said the angle formed therebetween is 0 degree.

On the other hand, as shown in FIGS. 3 and 4, a state of the electronic device 100 being opened is a state where the first housing 1 and the second housing 2 are arranged so as not to overlap each other so that the first display screen 4a of the first display part 3a and the second display screen 4b of the second display part 3b are simultaneously visible. The electronic device 100 shown in FIG. 3 is opened in such a manner that the first display screen 4a and the second display screen 4b form an angle of 180 degrees, in other words, in such a manner that they lie in the same plane. The electronic device 100 shown in FIG. 4 is opened in such a manner that the first display screen 4a and the second display screen 4b form an angle greater than 0 degree and smaller than 180 degrees.

Hereinafter, a state where the first display screen 4a and the second display screen 4b lie in the same plane as shown in FIG. 3 will be referred to as "flat state". A state where the first display screen 4a and the second display screen 4b are opened to form an angle greater than 0 degree and smaller than 180 degrees as shown in FIG. 4 will be referred to as "tilted state".

The first display screen 4a is a touch panel, and receives a screen operation performed by a user on the first display screen 4a. Likewise, the second display screen 4b is a touch panel, and receives a screen operation performed by the user on the second display screen 4b. In the following, in a case where there is no need to distinguish the first display part 3a from the second display part 3b, each of them will be referred to as "display part 3" and the display screen of each of them will be referred to as "display screen 4".

The first housing 1 and the second housing 2 are coupled to each other by a hinge portion 5 and an arm portion 6. The hinge portion 5 is provided in the second housing 2. The arm portion 6 is connected to the hinge portion 5 with its angle relative to the second housing 2 being variable. The arm portion 6 is connected to the first housing 1 with its angle relative to the first housing 1 being variable. Due to a function of the hinge portion 5 and the arm portion 6, the electronic device 100 can shift from the closed state shown in FIGS. 1 and 2 into the tilted state shown in FIG. 4, and can shift from the tilted state shown in FIG. 4 into the flat state shown in FIG. 3. Additionally, due to the function of the hinge portion 5 and the arm portion 6, the electronic device 100 can shift from the flat state shown in FIG. 3 into the tilted state shown in FIG. 4, and can shift from the tilted state shown in FIG. 4 into the closed state shown in FIGS. 1 and 2.

In the first housing 1, not only the first display part 3a but also a sound input part 7, a first sound output part 8, and a first operation part 10 are provided. In the second housing 2, not only the second display part 3b but also a second sound output part 9, a second operation part 11, a third operation part 12, a memory card insertion slot 13, and a charging terminal 14 are provided.

The sound input part 7 configured with a microphone, an amplifier, and the like. Each of the first sound output part 8 and the second sound output part 9 is configured with a speaker, an amplifier, and the like. The first sound output part 8 is configured for a call, and the volume thereof is set to be relatively low to such a level that the user can hear a sound outputted from the first sound output part 8 only when the user puts his/her ear close to the first sound output part 8. On the other hand, the volume of the second sound output part 9 is set to be relatively high to such a level that the user carrying the electronic device 100 can hear a sound outputted from the second sound output part 9 without putting his/her ear close to the second sound output part 9.

The first operation part 10 includes a home key 10a, a menu key 10b, and a back key 10c. These operation keys are provided on a main surface at the first display screen 4a side of the first housing 1, and each of them receives a contact operation performed by the user. The home key 10a is an operation key for displaying a home screen (initial screen) on the first display screen 4a. The menu key 10b is an operation key for displaying a menu screen. The back key 10c is an operation key for returning a display on the first display screen 4a to a previous display.

Similarly to the first operation part 10, the second operation part 11 includes a home key 11a, a menu key 11b, and a back key 11c. These keys are provided on a main surface at the second display screen 4b side of the second housing 2, and each of them receives a contact operation performed by the user. Functions of the home key 11a, the menu key 11b, and the back key 11c are the same as functions of the home key 10a, the menu key 10b, and the back key 10c of the first operation part 10.

The third operation part 12 includes a power key 12a and an adjusting key 12b. The power key 12a is an operation key for turning on and off the power of the electronic device 100. The adjusting key 12b is an operation key for adjusting the brightness of the display screen 4 and for adjusting the volumes of the first sound output part 8 and the second sound output part 9. These operation keys are provided on a side surface of the second housing 2, and each of them receives a pressing operation performed by the user.

In the memory card insertion slot 13, a memory card that is a card-shaped storage medium is inserted. To the charging terminal 14, a cable connected to a charger for charging the electronic device 100 is connected.

<Electrical Configuration>

Figure 5:
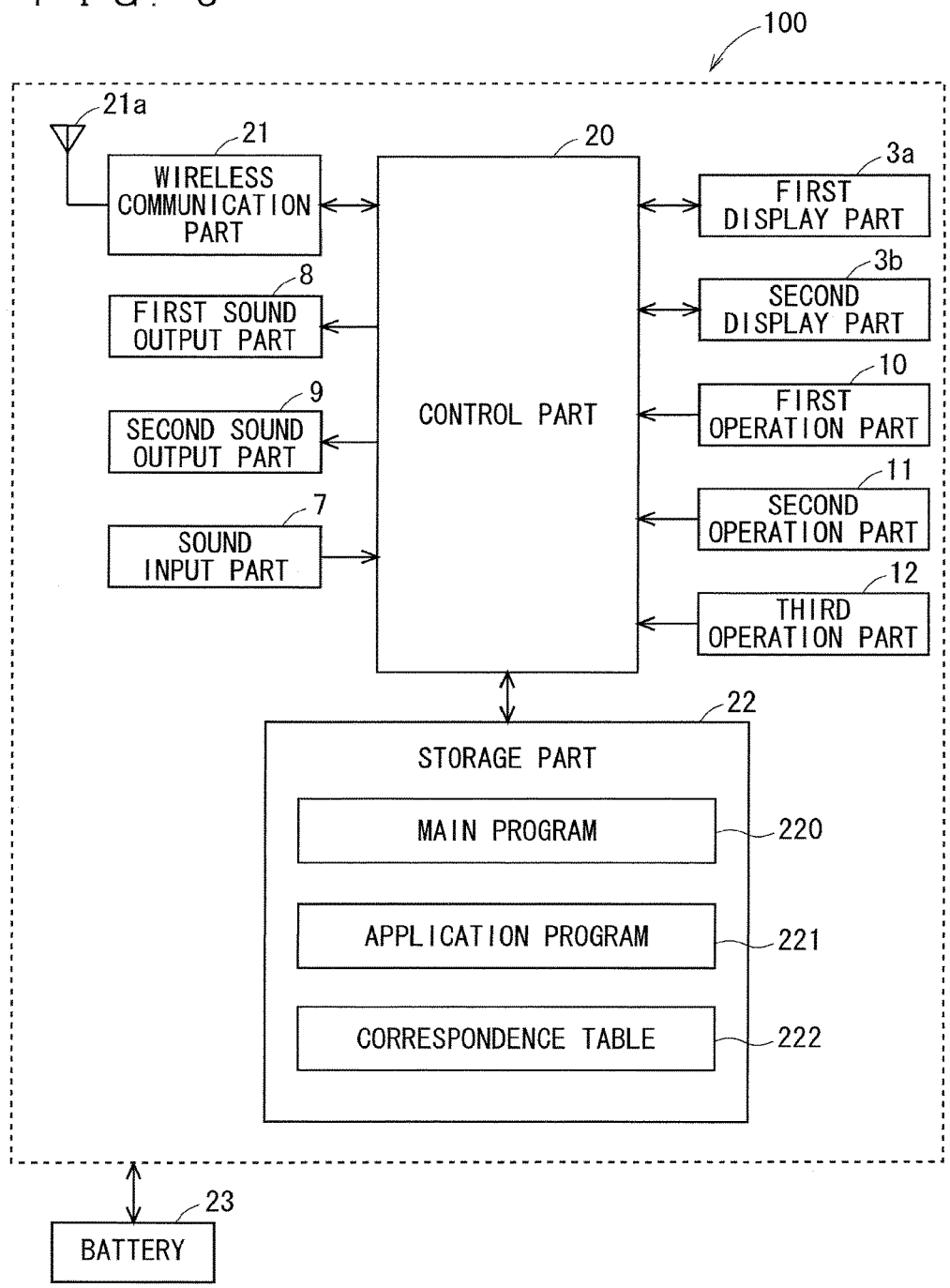
FIG. 5 is a block diagram showing an electrical configuration of the electronic device.

FIG. 5 is a block diagram showing an electrical configuration of the electronic device 100. As shown in FIG. 5, the electronic device 100 includes, in addition to the above-described component parts such as the first display part 3a and the second display part 3b, a control part 20, a wireless communication part 21, a storage part 22, and a battery 23.

The control part 20 is configured of a CPU (Central Processing Unit), a DSP (Digital Signal Processor), and the like, and controls other component parts of the electronic device 100 to thereby manage an overall operation of the electronic device 100. The control part 20 performs various operations in accordance with user operations received by the first display part 3a, the second display part 3b, the first operation part 10, the second operation part 11, and the third operation part 12.

The storage part 22 is configured of a ROM (Read Only Memory), a RAM (Random Access Memory), and the like. The storage part 22 stores therein a main program 220 that is a control program for controlling the electronic device 100, a plurality of application programs 221 (only one application program 221 is shown in the drawing), and the like. Various functions of the control part 20 are implemented by the CPU and the DSP of the control part 20 executing the various programs stored in the storage part 22. The storage part 22 also stores therein a correspondence table 222 which will be described later. The correspondence table 222 is used in a process performed by a process execution part 200 which will be described later.

The wireless communication part 21 receives, via an antenna 21a, a signal supplied through a base station from a mobile phone different from the electronic device 100 or a communication device such as a web server connected to the Internet. The wireless communication part 21 performs an amplification process and a down-conversion on a received signal, and outputs a resulting signal to the control part 20. The control part 20 performs a demodulation process and the like on the received signal inputted thereto, to obtain various data, such as voice data and image data, included in the received signal. The wireless communication part 21 performs an up-conversion and an amplification process on a transmission signal including voice data and the like which is generated by the control part 20, and wirelessly transmits the transmission signal obtained as a result of the process, via the antenna 21a, to a mobile phone different from the electronic device 100 or a communication device connected to the Internet.

The sound input part 7 converts a sound inputted from the outside, such as a voice, into sound data, and outputs the sound data to the control part 20. Each of the first sound output part 8 and the second sound output part 9 converts sound data supplied from the control part 20, such as voice data and music data, into a sound, and outputs the sound to the outside.

The first display part 3a and the second display part 3b have the same configuration. Each display part 3 is, for example, a backlight-type liquid crystal display part that presents a color display, and includes a liquid crystal display panel and a backlight for emitting a light thereto. Under control by the control part 20, each display part 3 displays various information such as characters, symbols, and graphics on the display screen 4 thereof. The display part 3 may be configured as a display part different from a liquid crystal display part. For example, the display part 3 may be an organic EL display, or may be a display part having a plurality of LEDs arranged in a matrix.

The battery 23 generates power of the electronic device 100. The power generated by the battery 23 is supplied to electronic components included in the control part 20, the wireless communication part 21, and the like, of the electronic device 100.

The storage part 22 stores therein various application programs 221 (hereinafter simply referred to as "application 221"). The storage part 22 stores therein, for example, a call application for performing voice communication, a browser for displaying a website, a mail application for preparing, viewing, transmitting, and receiving an e-mail, an electronic book viewing application for viewing an electronic book.

When the CPU or the DSP of the control part 20 reads out the application 221 from the storage part 22 and executes the application 221, this application 221 is invoked in the electronic device 100. The control part 20 executing the application 221 controls other component parts, such as the wireless communication part 21 and the display part 3, in the electronic device 100, and thereby a function (a function for performing the voice communication, a function for displaying a website, or the like) corresponding to this application 221 is run on the electronic device 100.

Figure 6:
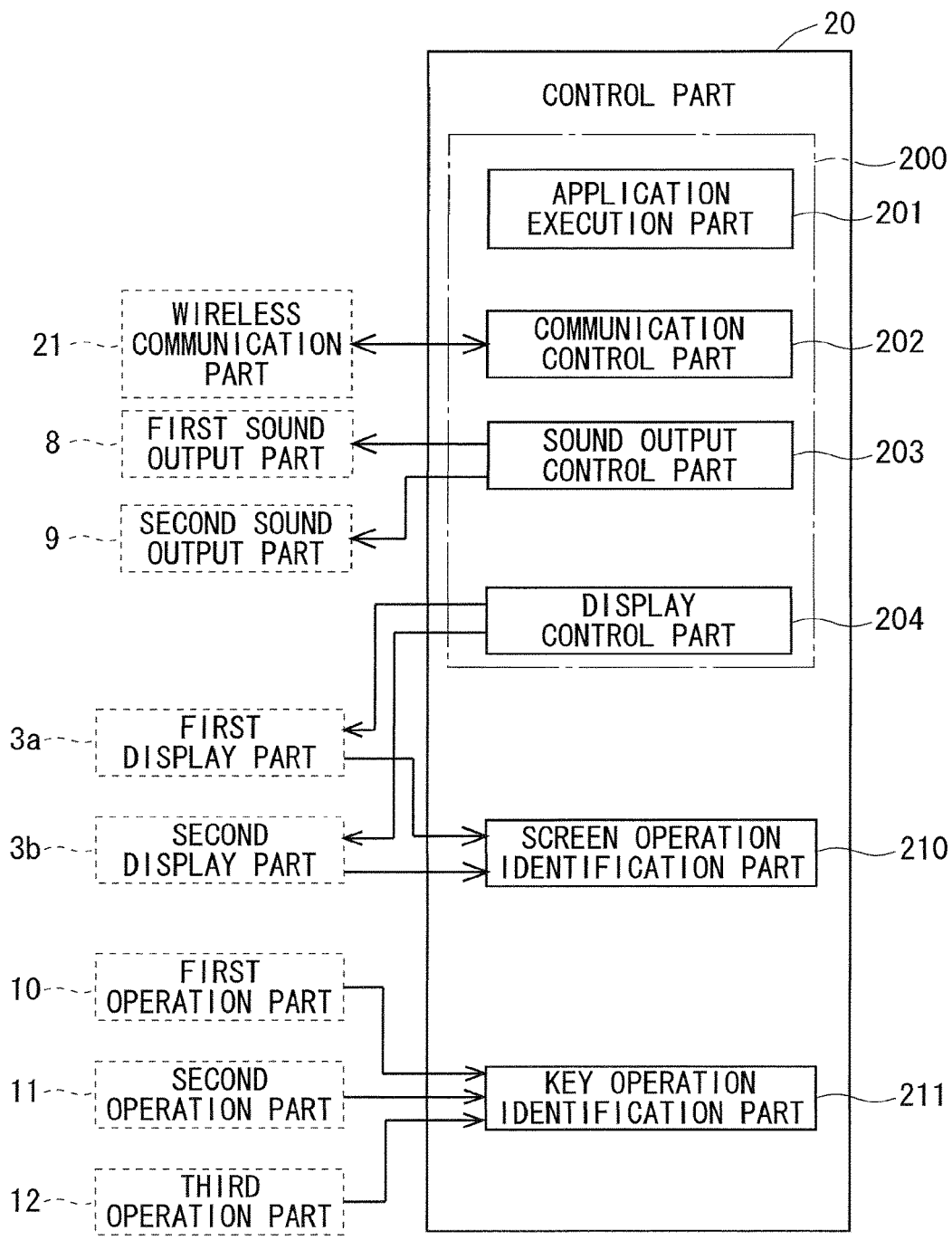
FIG. 6 is a diagram showing a functional block configuration of a control part.

Next, a plurality of function blocks included in the control part 20 will be described. FIG. 6 is a diagram showing the plurality of function blocks. The CPU of the control part 20 executes the main program 220 stored in the storage part 22, and thereby function blocks such as a process execution part 200, a screen operation identification part 210, and a key operation identification part 211 are formed in the control part 20, as shown in FIG. 6.

The screen operation identification part 210 identifies a content of the screen operation received by the first display screen 4a. For example, the screen operation identification part 210 identifies the screen operation performed on the first display screen 4a as an operation of pressing a certain portion of the first display screen 4a by a finger, or as an operation of moving a finger from a certain portion to another portion with the finger touching the first display screen 4a. Likewise, the screen operation identification part 210 identifies a content of the screen operation received by the second display screen 4b.

The key operation identification part 211 identifies which of the plurality of operation keys included in the first operation part 10 has been operated. The key operation identification part 211 also identifies which of the plurality of operation keys included in the second operation part 11 has been operated. The key operation identification part 211 also identifies which of the plurality of operation keys included in the third operation part 12 has been operated.

The process execution part 200 executes a process in accordance with the screen operation identified by the screen operation identification part 210, and executes a process in accordance with a key operation identified by the key operation identification part 211. The process execution part 200 includes an application execution part 201, a communication control part 202, a sound output control part 203, and a display control part 204.

The application execution part 201 executes the application 221 stored in the storage part 22. More specifically, in a case where the screen operation identification part 210 identifies that a screen operation instructing execution of a certain application 221 has been performed on the display screen 4, the application execution part 201 executes this application 221 stored in the storage part 22. In this preferred embodiment, an icon corresponding to the application 221 is presented on the home screen displayed on the display screen 4, and when this icon is operated by the user, an application 221 corresponding to this icon is executed. The operation performed on this icon is equivalent to the screen operation instructing execution of the application 221 which is performed on the display screen 4.

The sound output control part 203 controls a sound output of the first sound output part 8. The sound output control part 203 outputs sound data to the first sound output part 8, and causes the first sound output part 8 to output a sound to the outside. The sound output control part 203 also stops the output of the sound data to the first sound output part 8, and causes the first sound output part 8 to stop the output of the sound to the outside. The sound output control part 203 can control the volume of the first sound output part 8. In the same manner, the sound output control part 203 also controls a sound output of the second sound output part 9.

The display control part 204 controls displays on the first display part 3a and the second display part 3b. Under control by the display control part 204, the first display part 3a displays information such as characters on the first display screen 4a. Under control by the display control part 204, the second display part 3b displays information such as characters on the second display screen 4b.

The communication control part 202 controls the wireless communication part 21, to perform various communication with a communication partner. For example, the communication control part 202 perform voice communication and e-mail communication with a communication partner mobile phone. To perform the voice communication, the communication control part 202 generates a transmission signal including voice data received from the sound input part 7, and transmits the transmission signal to the communication partner mobile phone via the wireless communication part 21. The communication control part 202 obtains voice data from a signal received by the wireless communication part 21, and outputs the voice data to the first sound output part 8. The communication control part 202 performs data communication with the web server. A web page received by the communication control part 202 from the web server via the wireless communication part 21 is, under control on the display part 3 by the display control part 204, displayed on the display screen 4 of the display part 3.

<Process with Use of Associated Correspondence Table>

Figures 7, 8:
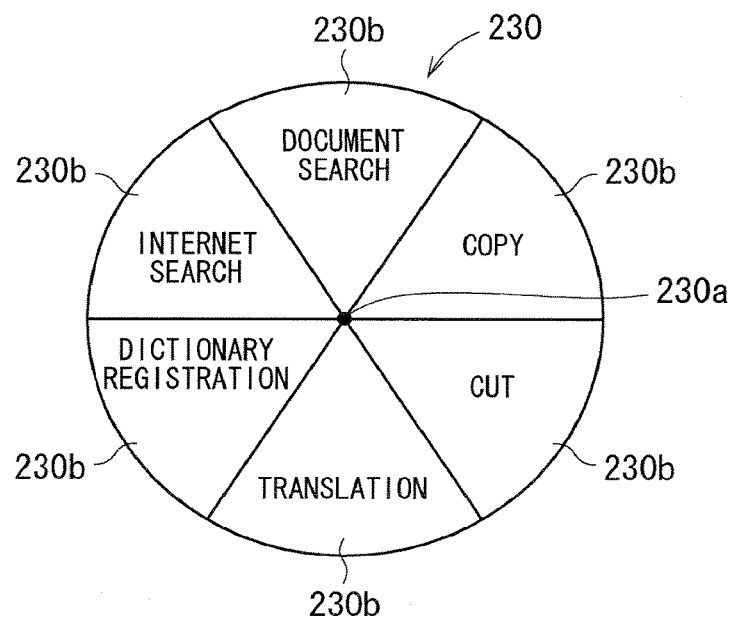
FIG. 7 is a diagram showing one example of a correspondence table.
FIG. 8 is a diagram showing one example of the correspondence table in a graphical form.

Next, a process executed by the process execution part 200 by using the correspondence table 222 will be described. FIG. 7 is a diagram showing one example of the correspondence table 222. The correspondence table 222 is correspondence information in which a process with use of information displayed on the display screen 4 and a screen operation on the display screen 4 instructing execution of this process are registered in association with each other. Hereinafter, the process with use of the information displayed on the display screen 4, such as a character, a symbol, a graphic, or an image, will be referred to as "displayed information use process". The screen operation on the display screen 4 instructing execution of the displayed information use process will be referred to as "execution instruction operation". In the correspondence table 222, each of a plurality of displayed information use processes is associated with the execution instruction operation that instructs execution of this displayed information use process.

In a case where the screen operation identification part 210 identifies that a screen operation for selecting information displayed on the display screen 4 is performed on the display screen 4 and then, following the screen operation, the execution instruction operation has been performed on the display screen 4, the process execution part 200 executes the displayed information use process associated with this execution instruction operation in the correspondence table 222 by using the information selected by the screen operation.

Hereinafter, the screen operation on the display screen 4 for selecting the information displayed on the display screen 4 will be referred to as "displayed information selection operation". The information selected by the displayed information selection operation will be referred to as "selected information". As the displayed information selection operation, for example, an operation is adopted in which a region of the display screen 4 where selection object information is displayed is traced with screen operation means and then the screen operation means is separated away from the display screen 4. At a time point when, after the region of the display screen 4 where the selection object information is displayed is traced with the screen operation means, the screen operation means is separated away from the display screen 4, the screen operation identification part 210 determines that the displayed information selection operation is completed. Examples of the screen operation means include a finger of the user or a pen-like member held by the user.

In this preferred embodiment, as the execution instruction operation, for example, a sliding operation for sliding in a predetermined direction from the selected information displayed on the display screen 4. That is, in this preferred embodiment, an operation in which the screen operation means is moved in the predetermined direction from the selected information displayed on the display screen 4 while the user touches the display screen 4 with the screen operation means, is adopted as the execution instruction operation.

In the correspondence table 222, a plurality of kinds of sliding operations for sliding in different directions from the selected information are registered as the execution instruction operation. In an example shown FIG. 7, an upper right sliding operation, a direct upward sliding operation, an upper left sliding operation, a lower left sliding operation, a direct downward sliding operation, and a lower right sliding operation are registered in the correspondence table 222.

Here, the "upper right sliding operation" represents an operation in which the user viewing the display screen 4 slides the screen operation means in an upper right direction from the selected information as seen from the viewpoint of the user. The "direct upward sliding operation" represents an operation in which the user viewing the display screen 4 slides the screen operation means in a direct upward direction from the selected information as seen from the viewpoint of the user. The "upper left sliding operation" represents an operation in which the user viewing the display screen 4 slides the screen operation means in an upper left direction from the selected information as seen from the viewpoint of the user. The "lower left sliding operation" represents an operation in which the user viewing the display screen 4 slides the screen operation means in a lower left direction from the selected information as seen from the viewpoint of the user. The "direct downward sliding operation" represents an operation in which the user viewing the display screen 4 slides the screen operation means in a direct downward direction from the selected information as seen from the viewpoint of the user. The "lower right sliding operation" represents an operation in which the user viewing the display screen 4 slides the screen operation means in a lower right direction from the selected information as seen from the viewpoint of the user. Hereinafter, directions such as a right direction and a left direction represent directions as seen from the viewpoint of the user viewing the display screen 4.

In the example shown in FIG. 7, in the correspondence table 222, the upper right sliding operation is associated with a process for copying the selected information. The direct upward sliding operation is associated with a document search for searching a document the indicating selected information for this selected information. In the correspondence table 222, the upper left sliding operation is associated with an Internet search for searching the Internet for the selected information by using a search site. The lower left sliding operation is associated with a process for registering the selected information in a dictionary. In the correspondence table 222, the direct downward sliding operation is associated with a process for translating the selected information (for example, a process for translating into English). The lower right sliding operation is associated with a process for cutting the selected information from a document indicating this selected information.

FIG. 8 shows the correspondence table 222 in a graphical form by using a circle 230, for ease of visual understanding of the associated correspondence between the execution instruction operation and the displayed information use process in the correspondence table 222 shown in FIG. 7. A center point 230*a* of the circle 230 indicates the position of the selected information on the display screen 4.

As shown in FIG. 8, the circle 230 is divided into upper and lower two parts based on the center point 230*a* as a reference. Each of an upper half circle and a lower half circle is sectioned into three fan-shaped regions 230*b*. In the fan-shaped region 230*b* located upper right of the center point 230*a* (the position of the selected information), a character string "copy" is shown. From this, it is understood that the upper right sliding operation is associated with the process for copying the selected information.

In the fan-shaped region 230*b* located direct upward of the center point 230*a* (the position of the selected information), a character string "document search" is shown. From this, it is understood that the direct upward sliding operation is associated with the document search for searching a document indicating the selected information for this selected information.

In the fan-shaped region 230*b* located upper left of the center point 230*a* (the position of the selected information), a character string "Internet search" is shown. From this, it is understood that the upper left sliding operation is associated with the Internet search for searching the Internet for the selected information by using the search site.

In the fan-shaped region 230*b* located lower left of the center point 230*a* (the position of the selected information), a character string "dictionary registration". From this, it is understood that the lower left sliding operation is associated with the process for registering the selected information in the dictionary.

In the fan-shaped region 230*b* located direct downward of the center point 230*a* (the position of the selected information), a character string "translation" is shown. From this, it is understood that the direct downward sliding operation is associated with the process for translating the selected information.

In the fan-shaped region 230*b* located lower right of the center point 230*a* (the position of the selected information), a character string "cut" is shown. From this, it is understood that the lower right sliding operation is associated with the process for cutting the selected information from the document indicating this selected information.

A cancellation of the selection of information displayed on the display screen 4 is executed when, for example, a tapping operation is performed on a region of the display screen 4 other than the region where this information is displayed. That is, in a case where, after the displayed information selection operation is performed, the screen operation identification part 210 identifies that the tapping operation has been performed on a region of the display screen 4 other than the region where the selected information is displayed, the process execution part 200 cancels the selection of the information selected by the displayed information selection operation. The tapping operation represents an operation performed from when the screen operation means touches the display screen to when the screen operation means is separated away without changing the touched portion. In a state where the selection of the information displayed on the display screen 4 is cancelled, even when the execution instruction operation is performed on the display screen 4, the displayed information use process corresponding to this execution instruction operation is not performed.

Next, a description will be given to a sequence of operations of the electronic device 100 in a time period from the displayed information selection operation being performed on the display screen 4 to execution of the displayed information use process with use of the information selected by the displayed information selection operation. In the following, a description will be given to an operation of the electronic device 100 in a case where the user selects a character string displayed on the display screen 4 (the first display screen 4a or the second display screen 4b) while the application execution part 201 is executing a web browser, a mail application, or an electronic book viewing application. Hereinafter, the display screen 4 to which the description is given will be sometimes referred to as "objective display screen 4".

Figure 9:
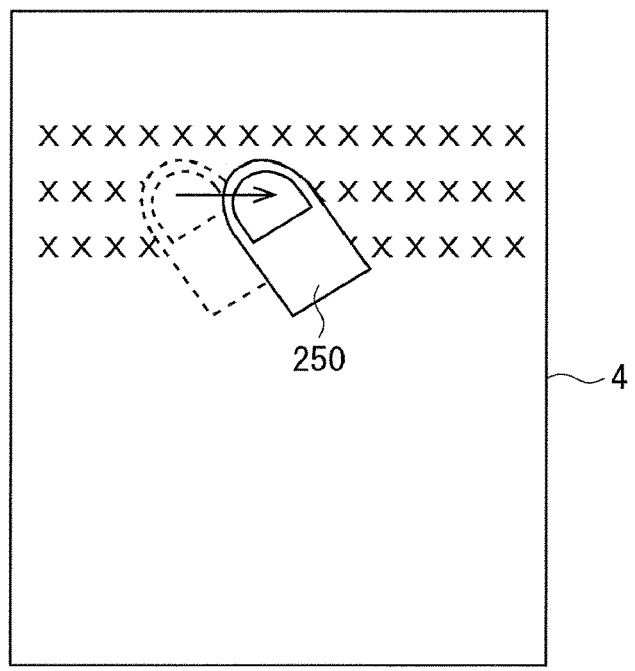
FIG. 9 is a diagram showing a situation where a user selects information.
Figure 10:
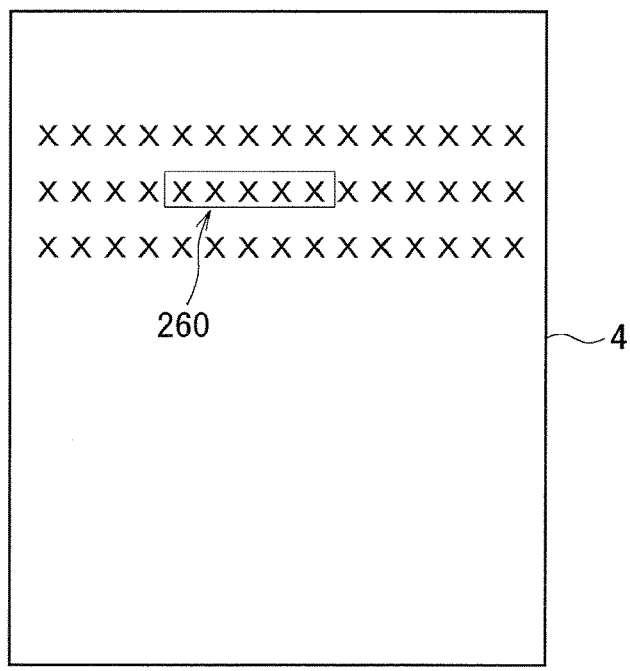
FIG. 10 is a diagram showing an exemplary display on a display screen after the information is selected.

As shown in FIG. 9, when the user traces, with his/her finger 250, a region of the objective display screen 4 where a selection object character string is displayed in the right direction and then separates the finger 250 away from the objective display screen 4, the screen operation identification part 210 identifies that the displayed information selection operation for selecting this character string has been performed on the objective display screen 4. Thus, in the process execution part 200, the display control part 204 controls the display part 3 including the objective display screen 4, to highlight (emphasize) the selected character string 260 (hereinafter referred to as "selected character string 260") that is the selected information on the objective display screen 4, as shown in FIG. 10.

Figure 11:
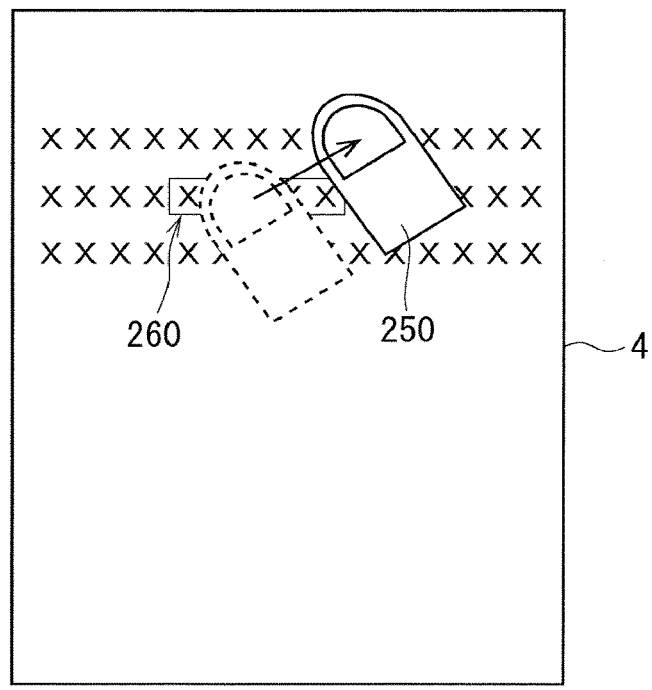
FIG. 11 is a diagram showing a situation where the user performs an execution instruction operation.

In a case where, subsequent to the displayed information selection operation, the user slides his/her finger 250 in the upper right direction from the selected character string 260 while his/her finger 250 is touching the objective display screen 4 as shown in FIG. 11, the screen operation identification part 210 identifies that, subsequent to the displayed information selection operation, the upper right sliding operation has been performed on the objective display screen 4. Thus, the process execution part 200 refers to the correspondence table 222, to execute the displayed information use process corresponding to the upper right sliding operation with use of the selected character string 260. To be specific, the process execution part 200 copies the selected character string 260, and stores the copy in the storage part 22.

Figure 12:
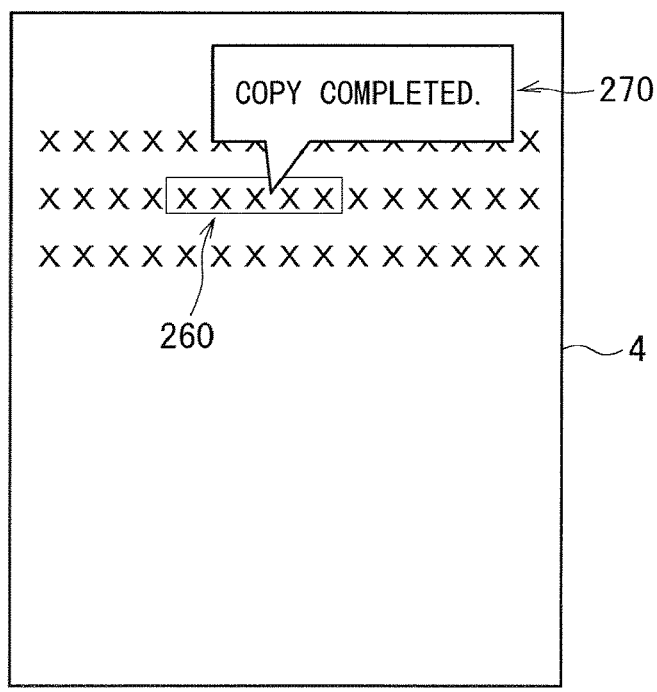
FIG. 12 is a diagram showing an exemplary display on the display screen after the execution instruction operation is performed.

In the process execution part 200, after the displayed information use process is completed, under control by the display control part 204, the display part 3 including the objective display screen 4 displays, on the objective display screen 4, process completion notification information 270 indicating that the displayed information use process is completed, which is, here, process completion notification information 270 indicating that copying of the selected character string 260 is completed, as shown in FIG. 12. After the process completion notification information 270 has been displayed on the objective display screen 4 for a certain time period, the display part 3 including the objective display screen 4 erases the display of the process completion notification information 270. Thereby, the process completion notification information 270 is automatically erased after being displayed for the certain time period.

Figure 13:
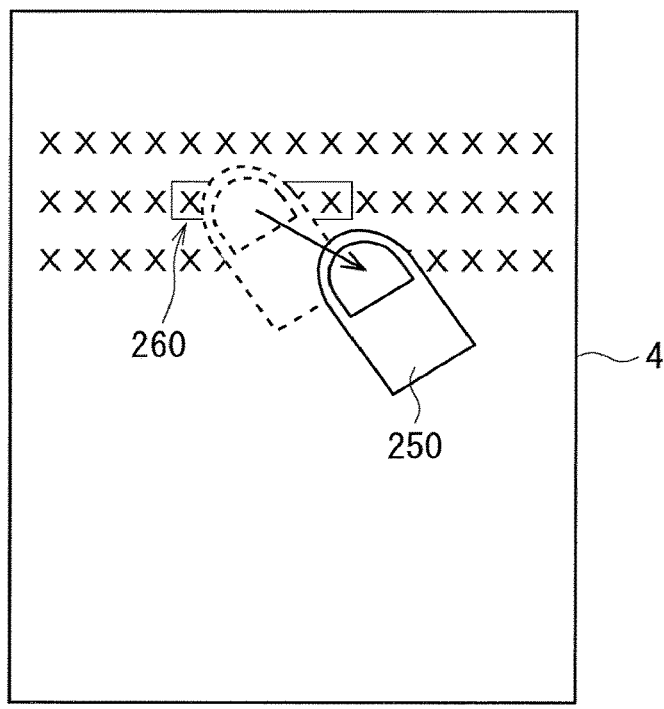
FIG. 13 is a diagram showing a situation where the user performs the execution instruction operation.

FIG. 13 is a diagram showing a situation where, subsequent to the displayed information selection operation, the user performs the lower right sliding operation on the objective display screen 4. In a case where, subsequent to the displayed information selection operation, the user slides his/her finger 250 in the lower right direction from the selected character string 260 while his/her finger 250 is touching the objective display screen 4 as shown in FIG. 13, the screen operation identification part 210 identifies that, subsequent to the displayed information selection operation, the lower right sliding operation has been performed on the objective display screen 4. Thus, the process execution part 200 refers to the correspondence table 222, to execute a cutout process corresponding to the lower right sliding operation with use of the selected character string 260. To be specific, the process execution part 200 cuts the selected character string 260 from the document indicating this selected character string 260.

Figure 14:
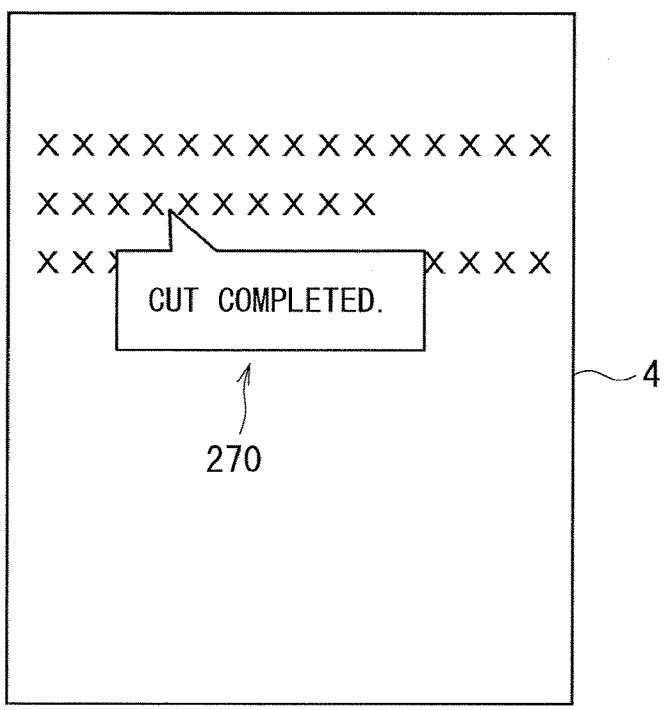
FIG. 14 is a diagram showing an exemplary display on the display screen after the execution instruction operation is performed.

In the process execution part 200, after the cutout process is completed, under control by the display control part 204, the display part 3 including the objective display screen 4 displays, on the objective display screen 4, the process completion notification information 270 indicating that the cutout process on the objective display screen 4 is completed, as shown in FIG. 14. The process completion notification information 270 is automatically erased after being displayed for a certain time period.

Figure 15:
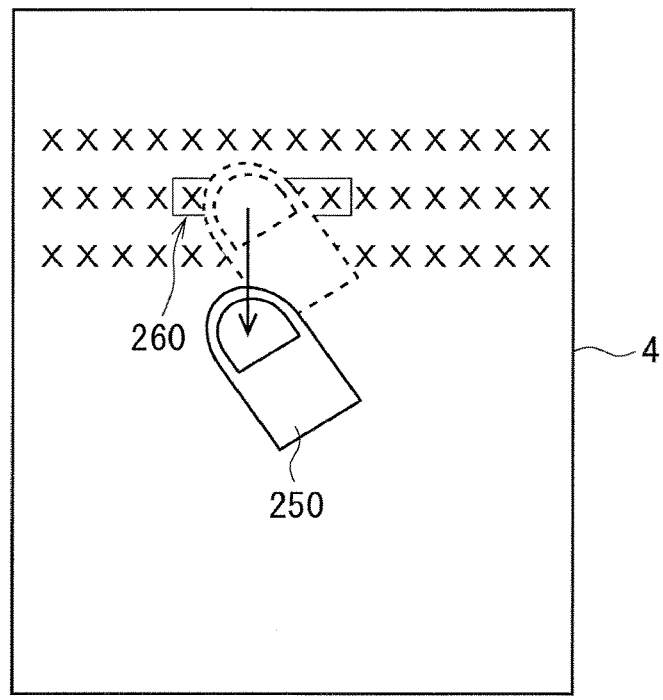
FIG. 15 is a diagram showing a situation where the user performs the execution instruction operation.

FIG. 15 is a diagram showing a situation where, subsequent to the displayed information selection operation, the user performs the direct downward sliding operation on the objective display screen 4. In a case where, subsequent to the displayed information selection operation, the user slides his/her finger 250 in the direct downward direction from the selected character string 260 while his/her finger 250 is touching the objective display screen 4 as shown in FIG. 15, the screen operation identification part 210 identifies that, subsequent to the displayed information selection operation, the direct downward sliding operation has been performed on the objective display screen 4. Thus, the process execution part 200 refers to the correspondence table 222, to execute a translation process corresponding to the direct downward sliding operation with use of the selected character string 260. To be specific, the process execution part 200 translates the selected character string 260 into English.

Figure 16:
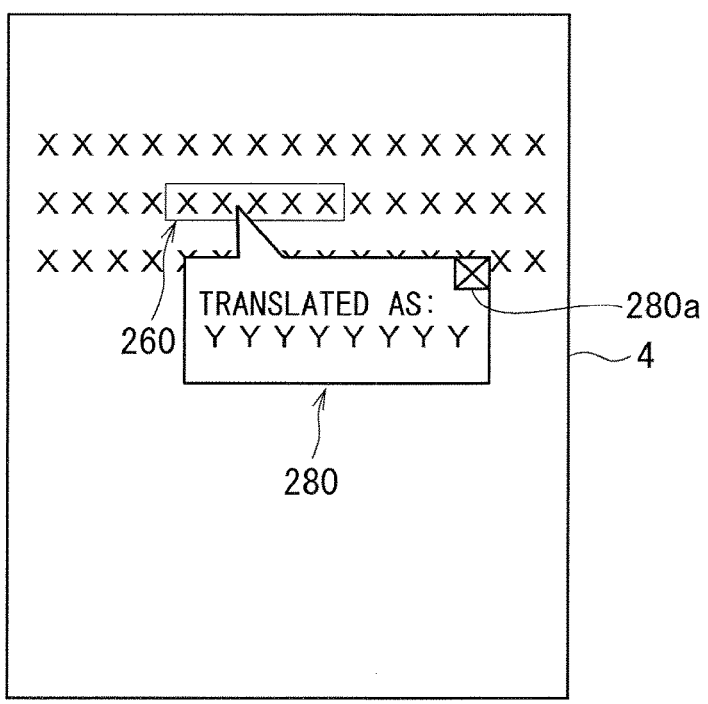
FIG. 16 is a diagram showing an exemplary display on the display screen after the execution instruction operation is performed.

In the process execution part 200, after the translation process is completed, under control by the display control part 204, the display part 3 including the objective display screen 4 displays, on the objective display screen 4, processing result notification information 280 indicating a processing result of the displayed information use process, which is, here, processing result notification information 280 indicating a result of translation of the selected character string 260 (English translation of the selected character string 260), as shown in FIG. 16.

Here, if the processing result notification information 280 is automatically erased after being displayed for a certain time period similarly to the process completion notification information 270, there is a possibility that the user cannot sufficiently check the processing result of the displayed information use process executed by the electronic device 100. Accordingly, in this preferred embodiment, the display of the processing result notification information 280 can be erased at the discretion of the user. More specifically, as shown in FIG. 16, not only the processing result notification information 280 but also a display erase button 280a for erasing this display is displayed on the objective display screen 4. When the screen operation identification part 210 identifies that the user has operated the display erase button 280a, under control by the display control part 204, the display part 3 including the objective display screen 4 erases the display of the processing result notification information 280.

Instead of providing the display erase button 280a, it may be also acceptable that the display of the processing result notification information 280 is erased when the user performs the tapping operation on a region of the display screen 4 different from the regions where the selected character string 260 and the processing result notification information 280 are displayed.

Figure 17:
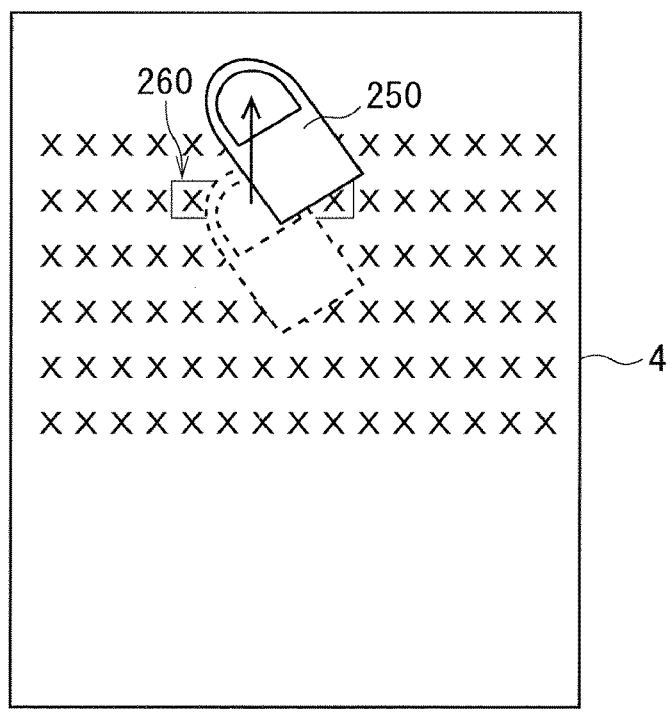
FIG. 17 is a diagram showing a situation where the user performs the execution instruction operation.

FIG. 17 is a diagram showing a situation where, subsequent to the displayed information selection operation, the user performs the direct upward sliding operation on the objective display screen 4. In a case where, subsequent to the displayed information selection operation, the user slides his/her finger 250 in the direct upward direction from the selected character string 260 while his/her finger 250 is touching the objective display screen 4 as shown in FIG. 17, the screen operation identification part 210 identifies that, subsequent to the displayed information selection operation, the direct upward sliding operation has been performed on the objective display screen 4. Thus, the process execution part 200 refers to the correspondence table 222, to execute the document search corresponding to the direct upward sliding operation with use of the selected character string 260. To be specific, the process execution part 200 searches the document indicating the selected character string 260 for this selected character string 260.

Figure 18:
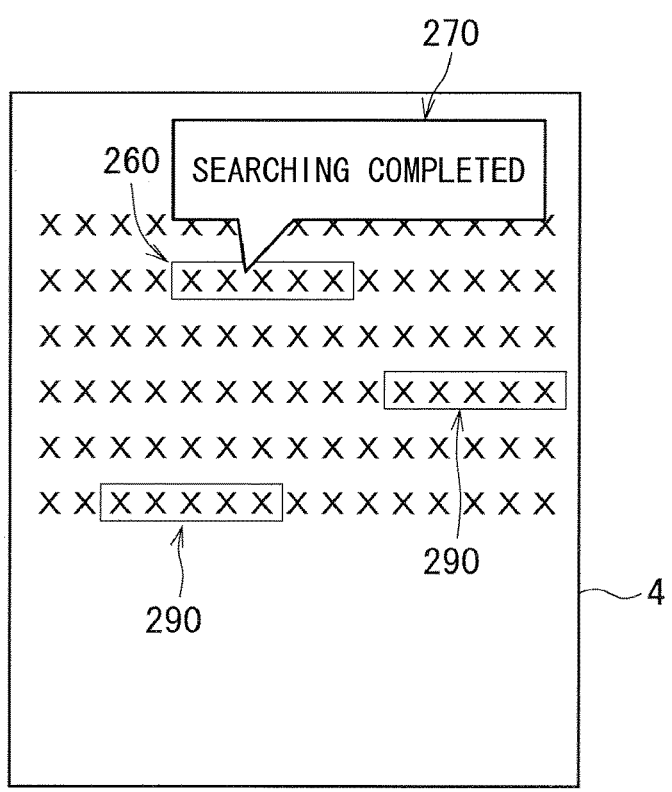
FIG. 18 is a diagram showing an exemplary display on the display screen after the execution instruction operation is performed.

In the process execution part 200, after the document search is completed, under control by the display control part 204, the display part 3 including the objective display screen 4 displays, on the objective display screen 4, the process completion notification information 270 indicating that the document search on the objective display screen 4 is completed, as shown in FIG. 18. The process completion notification information 270 is automatically erased after being displayed for a certain time period.

Moreover, on the objective display screen 4, a result of the document search for the selected character string 260 is presented. More specifically, as shown in FIG. 18, in the document including the selected character string 260, a character string 290 that is coincident with the selected character string 260 is highlighted. At this time, the selected character string 260 and the character string 290 coincident with the selected character string 260 may be highlighted in different manners.

Figure 19:
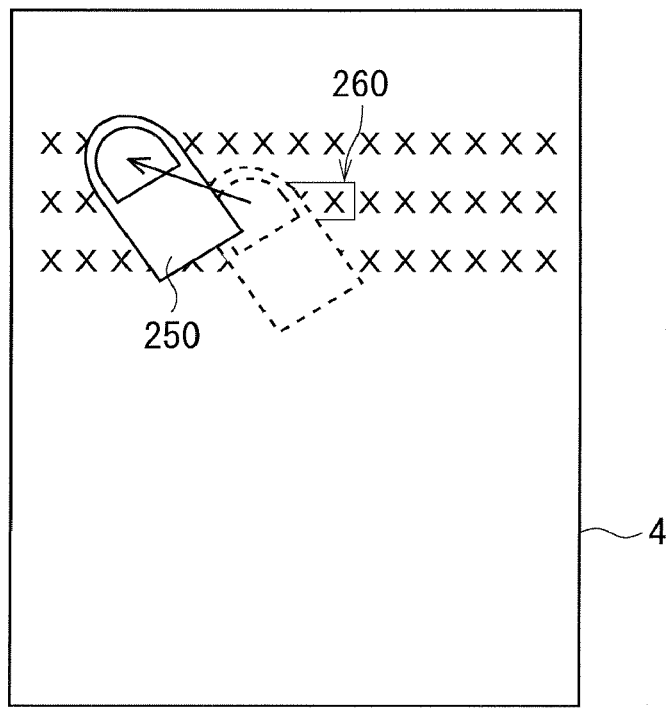
FIG. 19 is a diagram showing a situation where the user performs the execution instruction operation.

FIG. 19 is a diagram showing a situation where, subsequent to the displayed information selection operation, the user performs the upper left sliding operation on the objective display screen 4. In a case where, subsequent to the displayed information selection operation, the user slides his/her finger 250 in the upper left direction from the selected character string 260 while his/her finger 250 is touching the objective display screen 4 as shown in FIG. 19, the screen operation identification part 210 identifies that, subsequent to the displayed information selection operation, the upper left sliding operation has been performed on the objective display screen 4. Thus, the process execution part 200 refers to the correspondence table 222, to execute the Internet search corresponding to the upper left sliding operation with use of the selected character string 260. To be specific, the process execution part 200 searches the Internet for the selected character string 260 by using the search site.

Figure 20:
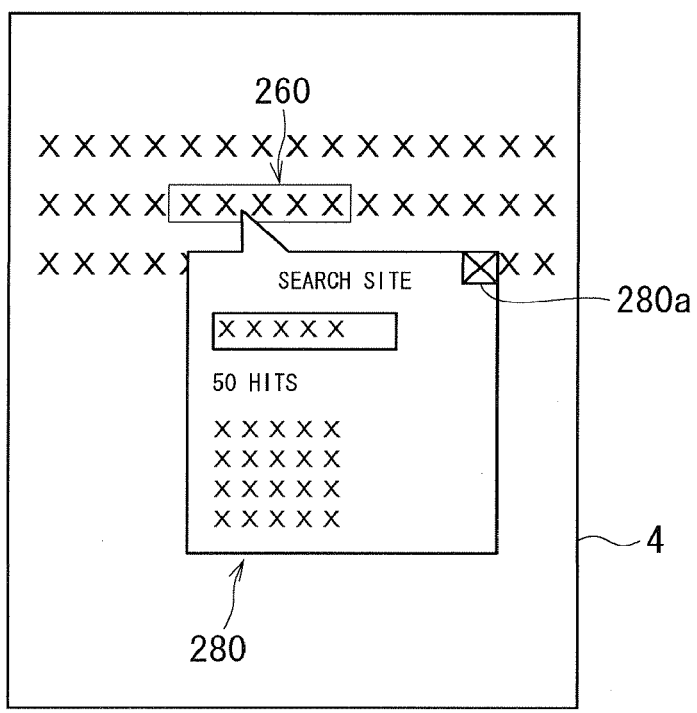
FIG. 20 is a diagram showing an exemplary display on the display screen after the execution instruction operation is performed.

In the process execution part 200, after the Internet search is completed, under control by the display control part 204, the display part 3 including the objective display screen 4 displays, on the objective display screen 4, the processing result notification information 280 indicating a processing result of the Internet search, as shown in FIG. 20. In an example shown in FIG. 20, a thumbnail of the search site indicating a search result obtained by inputting the selected character string 260 as a search keyword is displayed as the processing result notification information 280. Similarly to an example shown in FIG. 16, the processing result notification information 280 is erased from the objective display screen 4 when the screen operation identification part 210 identifies that the user has operated the display erase button 280a. In this case as well, instead of providing the display erase button 280a, it may be also acceptable that the display of the processing result notification information 280 is erased when the user performs the tapping operation on a region of the display screen 4 different from the regions where the selected character string 260 and the processing result notification information 280 are displayed.

As the processing result notification information 280, a search site indicating a search result obtained by inputting the selected character string 260 as a search keyword may be displayed, without any change, on the display screen 4 by using a web browser.

In a case where the search site used in the Internet search is an image search site, a thumbnail of an image that is a search result obtained by inputting the selected character string 260 as a search keyword to the image search site may be displayed as the processing result notification information 280.

FIG. 21 is a diagram showing a situation where, subsequent to the displayed information selection operation, the user performs the lower left sliding operation on the objective display screen 4. As shown in FIG. 21, in a case where, subsequent to the displayed information selection operation, the user slides his/her finger 250 in the lower left direction from the selected character string 260 while his/her finger 250 is touching the objective display screen 4, the screen operation identification part 210 identifies that, subsequent to the displayed information selection operation, the lower left sliding operation has been performed on the objective display screen 4. Thus, the process execution part 200 refers to the correspondence table 222, to execute the dictionary registration process corresponding to the lower left sliding operation with use of the selected character string 260. To be specific, the process execution part 200 registers the selected character string 260 into a dictionary database stored in the storage part 22.

In the process execution part 200, after the dictionary registration process is completed, under control by the display control part 204, the display part 3 including the objective display screen 4 displays, on the objective display screen 4, the process completion notification information 270 indicating that the dictionary registration process on the objective display screen 4 is completed, as shown in FIG. 22. The process completion notification information 270 is automatically erased after being displayed for a certain time period.

In the example described above, the description has been given to the operation of the electronic device 100 in a case where the selected information is composed of characters. However, in cases where the selected information is composed of a symbol, the selected information is composed of a graphic, and the selected information is composed of an image, the electronic device 100 similarly executes the displayed information use process with use of the selected information.

Here, in a case where the selected information is composed of a graphic or an image, the selected information cannot be registered in the dictionary and the selected information cannot be translated. Therefore, in this preferred embodiment, the lower left sliding operation and the direct downward sliding operation performed on the display screen 4 in such cases are invalid. More specifically, in a case where the selected information is composed of a graphic or an image, even when the screen operation identification part 210 identifies that the lower left sliding operation has been performed on the display screen 4, the process execution part 200 does not executes the displayed information use process corresponding to the lower left sliding operation. In a case where the selected information is composed of a graphic or an image, even when the screen operation identification part 210 identifies that the direct downward sliding operation has been performed on the display screen 4, the process execution part 200 does not execute the displayed information use process corresponding to the direct downward sliding operation.

In some cases, information such as characters shown on a website or an electronic book may be forbidden from a cut process. Additionally, some types of the document file preparation applications are provided with a function that can forbid, for example, copying of characters and the like contained in a document prepared by using this application. Thus, the information selected by the displayed information selection operation may not be copied, for example.

Figure 23:
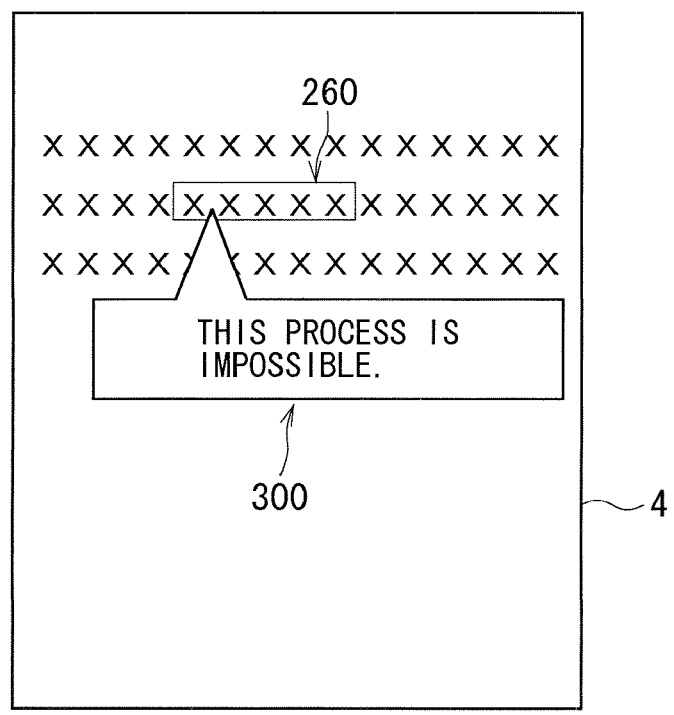
FIG. 23 is a diagram showing an exemplary display on the display screen after the execution instruction operation is performed.

In this preferred embodiment, in a case where the execution instruction operation is performed subsequent to the displayed information selection operation, when the displayed information use process corresponding to this execution instruction operation with use of the information selected by the displayed information selection operation is forbidden, the process execution part 200 does not execute such a displayed information use process. At this time, after the execution instruction operation is performed, execution disapproval notification information 300 for notifying that the displayed information use process corresponding to this execution instruction operation cannot be executed, may be displayed on the display screen 4, as shown in FIG. 23. As described above, it is also possible that, in a case where the selected information is composed of a graphic or an image, the execution disapproval notification information 300 is displayed on the display screen 4 when the lower left sliding operation or the direct downward sliding operation is performed on the display screen 4.

<Details of Method for Identifying Execution Instruction Operation>

Figure 24:
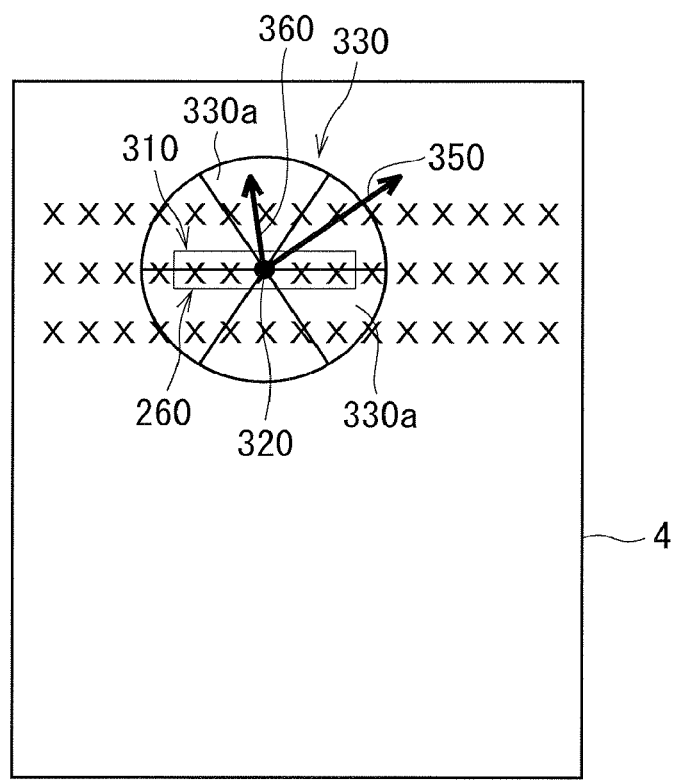
FIG. 24 is a diagram for explaining a method for identifying the execution instruction operation.

In this preferred embodiment, even when the sliding operation is performed on the display screen 4, the screen operation identification part 210 does not immediately identify that the execution instruction operation has been performed on the display screen 4. In a case where the sliding operation is performed over a predetermined distance on the display screen 4, the screen operation identification part 210 identifies that the execution instruction operation has been performed on the display screen 4. That is, the execution instruction operation according to this preferred embodiment is not simply a sliding operation, but a sliding operation over the predetermined distance or more. This improves the operability because, even if the user makes an accidental operation, no response is made as long as it is not the sliding operation over the predetermined distance. In the following, a method by which the screen operation identification part 210 identifies the execution instruction operation will be described in detail with reference to FIG. 24. FIG. 24 is a diagram for explaining an operation of the screen operation identification part 210.

After performing the displayed information selection operation, in order to perform the execution instruction operation, the user firstly touches, with the screen operation means (such as a finger or a pen-like member), a region 310 of the display screen 4 where the selected information (in an example shown in FIG. 24, a selected character string 260) is displayed. The screen operation identification part 210 considers a circle 330 having a predetermined radius around a center point 320 that is a touch point touched by the screen operation means. Then, the screen operation identification part 210 divides the circle 330 into upper and lower two parts based on the center point 320 as a reference, and sections each of resulting upper and lower half circles into three fan-shaped regions 330a. When the touch point touched by the screen operation means on the display screen 4 is moved from the center point 320, the screen operation identification part 210 identifies the fan-shaped region 330a to which the touch point is moved, and thereby identifies a sliding direction of the screen operation means, that is a direction in which the sliding operation as the execution instruction operation is being performed. For example, in a case where the touch point touched by the screen operation means on the display screen 4 is moving in the fan-shaped region 330a located upper right of the center point 320, the screen operation identification part 210 determines that the sliding operation (upper right sliding operation) sliding in the upper right direction from the selected information is being performed as the execution instruction operation. Then, as indicated by an arrow 350 in FIG. 24, when the touch point touched by the screen operation means on the display screen 4 is moved through the fan-shaped region 330a to the outside of the circle 330, the screen operation identification part 210 determines that the execution instruction operation has been performed (completed) on the display screen 4. At this time, it is possible that, when the touch point touched by the screen operation means on the display screen 4 is moved to the outside of the circle 330 and the screen operation means is separated away from the display screen 4, the screen operation identification part 210 determines that the execution instruction operation has been performed on the display screen 4. In other words, operations performed until the screen operation means is separated away from the display screen 4 may be included in the sliding operation. The process execution part 200 executes the displayed information use process in accordance with the execution instruction operation identified by the screen operation identification part 210.

On the other hand, as indicated by an arrow 360 in FIG. 24, when the screen operation means is separated away from the display screen 4 while the touch point touched by the screen operation means on the display screen 4 is not moved to the outside of the circle 330, the screen operation identification part 210 determines that the execution instruction operation has not been performed (completed) on the display screen 4. In this case, the process execution part 200 does not execute the displayed information use process with use of the selected information.

In a case where the screen operation means is separated away from the display screen 4 while the touch point touched by the screen operation means on the display screen 4 is not moved to the outside of the circle 330, the selection of the selected information may be cancelled, or the selection of the selected information may be maintained. When the selection of the selected information is cancelled, the user will newly perform the displayed information selection operation and then perform the execution instruction operation. When the selection of the selected information is maintained, the user can perform the execution instruction operation without newly performing the displayed information selection operation.

<Method for Setting Associated Correspondence Between Execution Instruction Operation and Displayed Information Use Process>

In this preferred embodiment, the user is allowed to set the associated correspondence between the execution instruction operation and the displayed information use process in the correspondence table 222 described above. In the following, a method for setting the associated correspondence between the execution instruction operation and the displayed information use process will be described.

Figure 25:
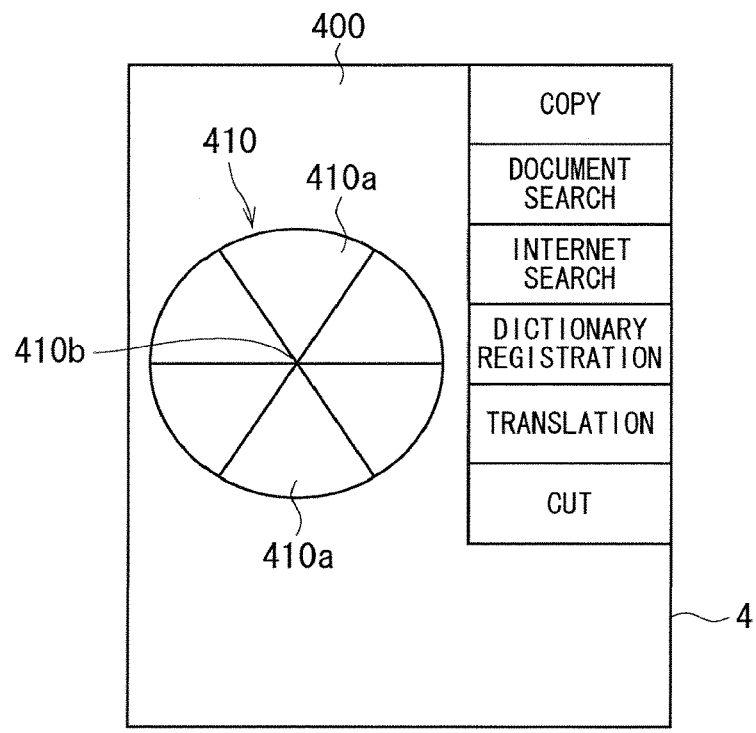
FIG. 25 is a diagram showing a table setting screen.

FIG. 25 is a diagram showing a situation where a table setting screen 400 is displayed on the display screen 4. The table setting screen 400 is used in setting the associated correspondence between the execution instruction operation and the displayed information use process in the correspondence table. When the menu key 10b or the menu key 11b is operated, the menu screen is displayed on the display screen 4 exposed on, among the first housing 1 and the second housing 2, the housing having the operated menu key. This menu screen displays a setting button for making various settings on the electronic device 100. When the user operates the setting button, set item buttons each corresponding to each set item are displayed on the display screen 4. The set item buttons include a set item button for setting the associated correspondence between the execution instruction operation and the displayed information use process. When the user operates this set item button, the table setting screen 400 shown in FIG. 25 is displayed on the display screen 4.

As shown in FIG. 25, names of a plurality of displayed information use processes that can be registered in the correspondence table 222 are shown in a right portion of the table setting screen 400, and a circle 410 is shown in a left portion thereof. In the circle 410, each of an upper half circle and a lower half circle is sectioned into three fan-shaped regions 410a. The six fan-shaped regions 410a included in the circle 410 correspond to six kinds of execution instruction operations that can be registered in the correspondence table 222, which are, in this example, six kinds of sliding operations. More specifically, the fan-shaped regions 410a located upper right, direct upward, and upper left of a center point 410b of the circle 410 correspond to the upper right sliding operation, the direct upward sliding operation, and the upper left sliding operation, respectively. The fan-shaped regions 410a located lower left, direct downward, and lower right of the center point 410b of the circle 410 correspond to the lower left sliding operation, the direct downward sliding operation, and the lower right sliding operation, respectively.

To associate a certain displayed information use process with a certain execution instruction operation, the user touches, with the screen operation means, a region of the table setting screen 400 where the name of this displayed information use process is shown, and then slides the screen operation means to the fan-shaped region 410a corresponding to this execution instruction operation. When such a sliding operation is identified by the screen operation identification part 210, the process execution part 200 registers the displayed information use process and the execution instruction operation in association with each other in the correspondence table 222.

Figure 26:
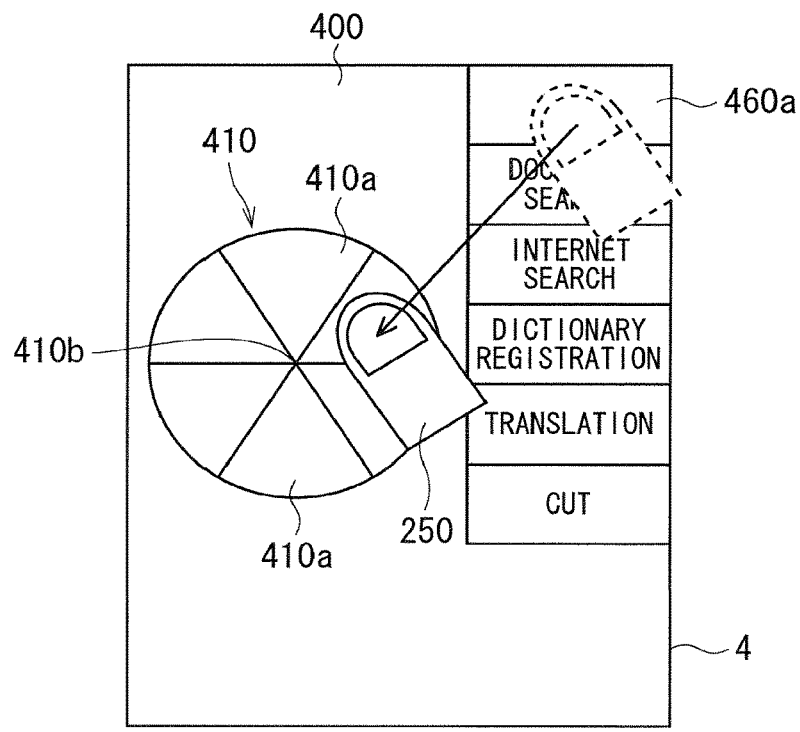
FIG. 26 is a diagram showing a situation where the user associates the execution instruction operation with a displayed information use process.
Figure 27:
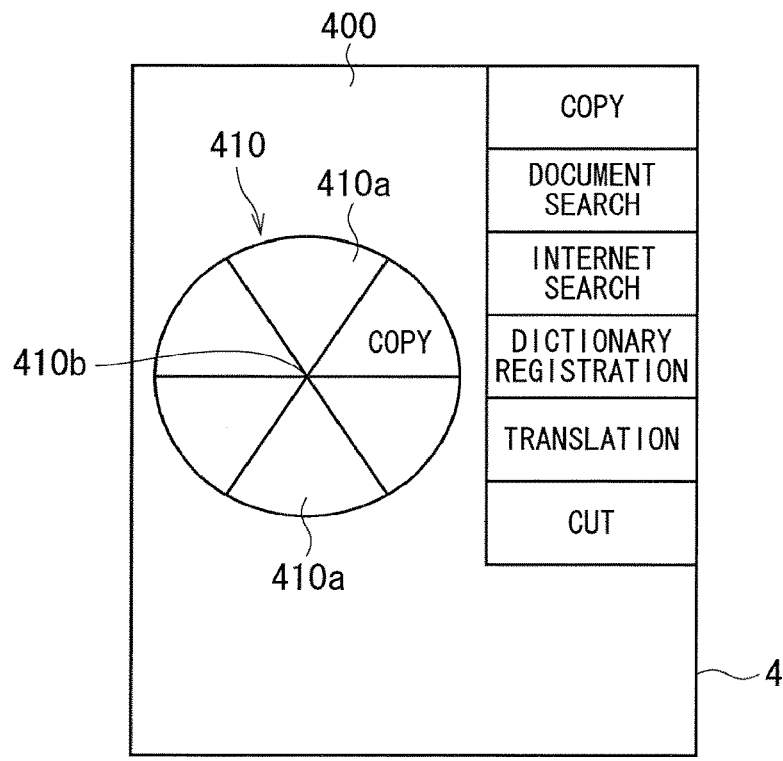
FIG. 27 is a diagram showing the table setting screen.

FIG. 26 is a diagram showing a situation where the user is associating "copy" with "upper right sliding operation" with his/her finger 250. As shown in FIG. 26, when the user touches a region 460a of the table setting screen 400 where the character string "copy" is shown with the finger 250 and then slides the finger 250 to the fan-shaped region 410a corresponding to "upper right sliding operation", "copy" and "upper right sliding operation" are registered in association with each other in the correspondence table 222. Thereby, as shown in FIG. 27, the character string "copy" is shown in the fan-shaped region 410a corresponding to the upper right sliding operation.

Figure 28:
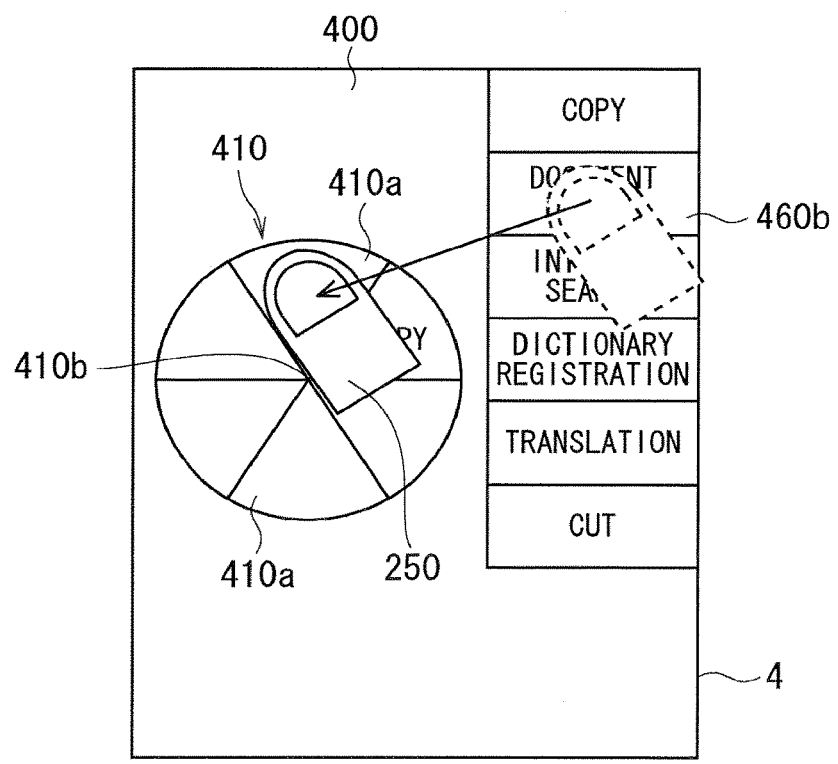
FIG. 28 is a diagram showing a situation where the user associates the execution instruction operation with the displayed information use process.
Figure 29:
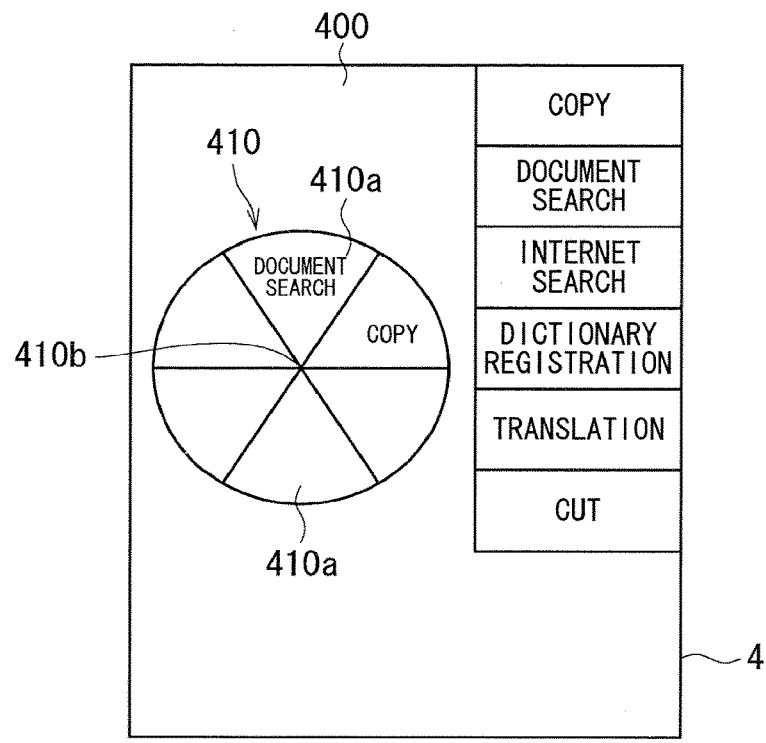
FIG. 29 is a diagram showing the table setting screen.

Then, as shown in FIG. 28, when the user touches a region 460b of the table setting screen 400 where the character string "document search" is shown with the finger 250 and then slides the finger 250 to the fan-shaped region 410a corresponding to "direct upward sliding operation", "document search" and "direct upward sliding operation" are registered in association with each other in the correspondence table 222. Thereby, as shown in FIG. 29, the character string "document search" is shown in the fan-shaped region 410a corresponding to "direct upward sliding operation".

Figure 30:
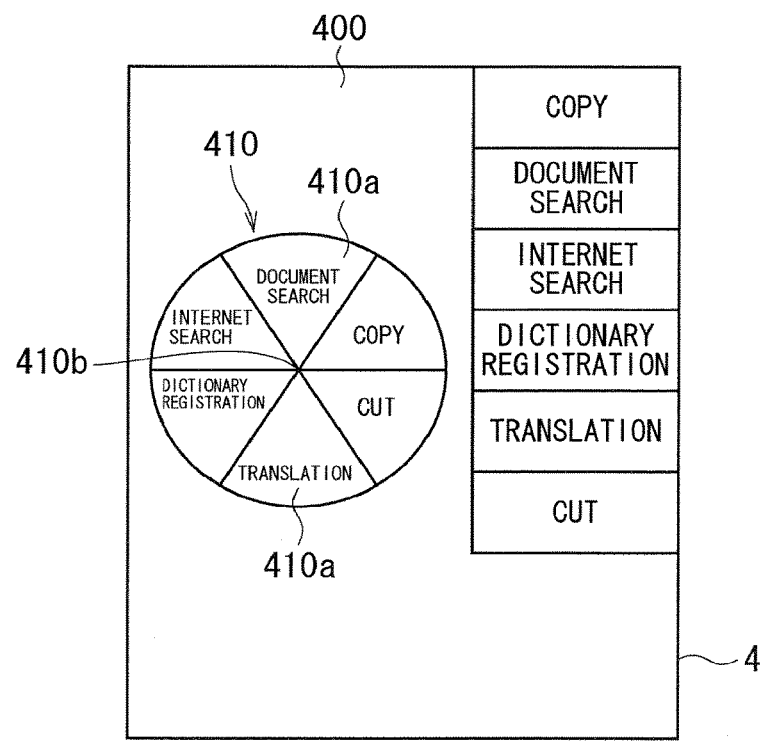
FIG. 30 is a diagram showing the table setting screen.

Then, in the same manner, "Internet search" and "upper left sliding operation" are associated with each other, "dictionary registration" and "lower left sliding operation" are associated with each other, "translation" and "direct downward sliding operation" are associated with each other, and "cut" and "lower right sliding operation" are associated with each other. As a result, a display as shown in FIG. 30 is presented on the table setting screen 400. Thereby, the above-described correspondence table 222 as shown in FIG. 7 is generated.

As described above, in the electronic device 100 according to this preferred embodiment, in a case where the execution instruction operation subsequent to the displayed information selection operation is performed on the display screen 4, the displayed information use process associated with this execution instruction operation in the correspondence table 222 is executed with use of the selected information. Accordingly, the user, after selecting information displayed on the display screen 4, has merely to perform a simple operation on the display screen 4 in order to cause the electronic device 100 to execute the desired displayed information use process with use of this information. This improves the operability of the electronic device 100.

On the other hand, in a case where the user uses a mouse in order to instruct a personal computer to execute a process such as copying, the user needs to perform an operation for selecting information displayed on the display screen by using the mouse and then click the right mouse button to thereby display a context menu for selecting a process that should be executed by the personal computer. Then, the user selects a process that should be executed by the personal computer, in the displayed context menu. That is, in this case, it is necessary that the user performs the operation for selecting information displayed on the display screen and then performs the operation for displaying the context menu for selecting the process that should be executed by the personal computer.

In this preferred embodiment, the user, after selecting information displayed on the display screen 4, can cause the electronic device 100 to execute the displayed information use process only by performing the execution instruction operation. Accordingly, the user can cause the electronic device 100 to execute a desired process without performing any operation for displaying the context menu.

In this preferred embodiment, the sliding operation is adopted as the execution instruction operation. Accordingly, the user can, by a simple operation, instruct the electronic device 100 to execute the displayed information use process.

In this preferred embodiment, the plurality of kinds of sliding operations corresponding to different directions are registered in the correspondence table 222. Accordingly, the user can change the displayed information use process that should be executed by the electronic device 100, only by changing the direction of the sliding operation. This further improves the operability of the electronic device 100.

<Various Modifications>
<First Modification>

Although, in the example described above, the sliding operation is adopted as the execution instruction operation, other screen operations are adoptable. For example, a flick operation may be adopted as the execution instruction operation. Here, the flick operation represents such an operation that a time period from when the screen operation means touches the display screen to when the screen operation means is separated away from the display screen is shorter than a predetermined time period and the screen operation means is moved over a predetermined distance or more during the time period from when the screen operation means touches the display screen to when the screen operation means is separated away from the display screen.

In a case where the flick operation is adopted as the execution instruction operation, instead of the upper right sliding operation, the direct upward sliding operation, the upper left sliding operation, the lower left sliding operation, the direct downward sliding operation, and the lower right sliding operation, a flick operation in the upper right direction, a flick operation in the direct upward direction, a flick operation in the upper left direction, a flick operation in the lower left direction, a flick operation in the direct downward direction, and a flick operation in the lower right direction, respectively, are registered in the correspondence table 222.

In this manner, also in a case where the flick operation is adopted as the execution instruction operation, the user can, by a simple operation, instruct the electronic device 100 to execute the displayed information use process.

When a plurality of kinds of flick operations traveling in different directions are registered in the correspondence table 222, the user can change the displayed information use process that should be executed by the electronic device 100, only by changing the direction of the flick operation. This improves the operability of the electronic device 100.

<Second Modification>

Although, in the example described above, the six displayed information use processes are registered in the correspondence table 222, the number of registered displayed information use processes may be smaller than six, or the number of registered displayed information use processes may be greater than six.

As for the displayed information use process, a process different from the processes shown in FIG. 7 may be registered in the correspondence table 222. For example, a process for translating the selected information into French, or a process for translating the selected information into Korean, may be registered in the correspondence table 222.

Figures 31, 32:
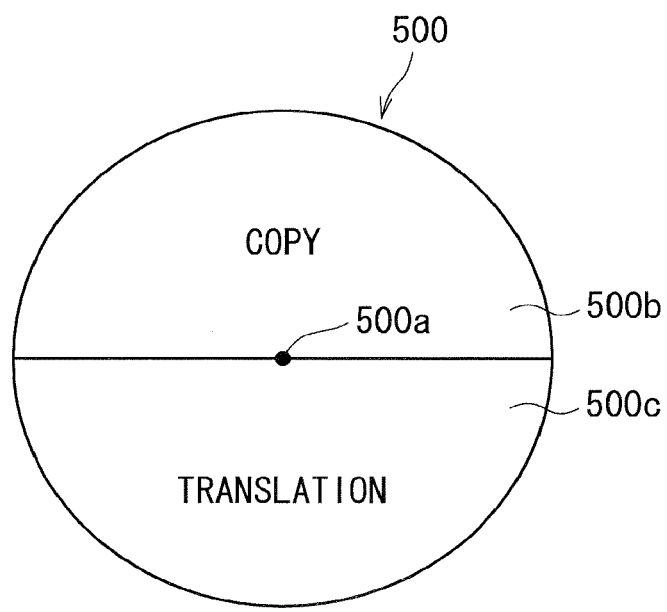
FIG. 31 is a diagram showing one example of the correspondence table.
FIG. 32 is a diagram showing one example of the correspondence table in a graphical form.

FIG. 31 is a diagram showing a situation where only two displayed information use processes of "copy" and "translation" are registered in the correspondence table 222. In the correspondence table 222 shown in FIG. 31, "copy" and "upward sliding operation" are associated with each other, and "translation" and "downward sliding operation" are associated with each other. Here, the "upward sliding operation" represents an operation in which the user slides the screen operation means in an upward direction from the selected information. The "downward sliding operation" represents an operation in which the user slides the screen operation means in the downward direction from the selected information.

FIG. 32, similarly to FIG. 8 described above, shows the correspondence table 222 in a graphical form by using a circle 500, for ease of visual understanding of the associated correspondence between the execution instruction operation and the displayed information use process in the correspondence table 222 shown in FIG. 31. A center point 500a of the circle 500 indicates the position of the selected information on the display screen 4.

As shown in FIG. 32, the circle 500 is divided into upper and lower two parts based on the center point 500a as a reference. In an upper half circle 500b based on the center point 500a (the position of the selected information), a character string "copy" is shown. In a lower half circle 500c based on the center point 500a (the position of the selected information), a character string "translation" is shown. From this, it is understood that the upward sliding operation is associated with the process for copying the selected information while the downward sliding operation is associated with the process for translating the selected information.

Figure 33:
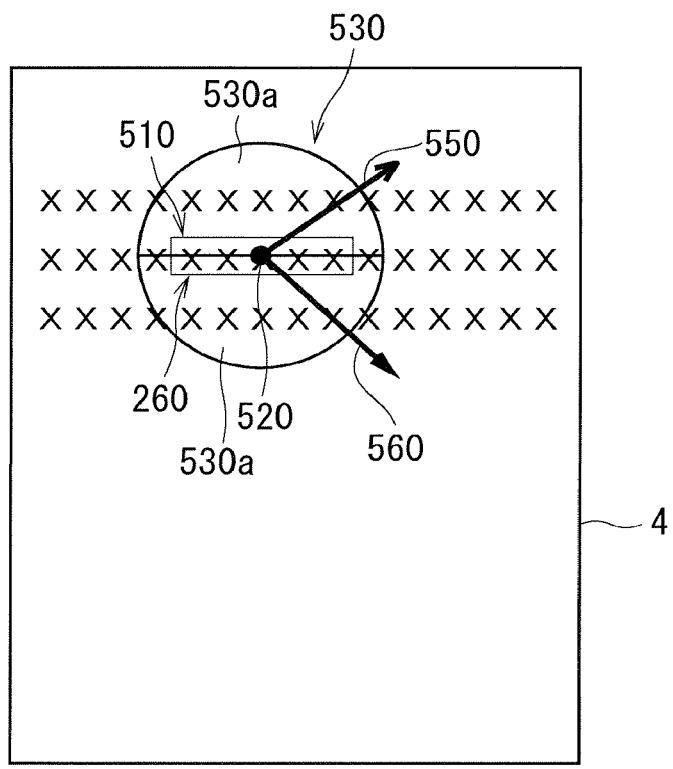
FIG. 33 is a diagram for explaining a method for identifying the execution instruction operation.

FIG. 33 is a diagram for explaining a method by which the screen operation identification part 210 identifies the execution instruction operation in a case of using the correspondence table 222 shown in FIG. 31.

As described above, after performing the displayed information selection operation, in order to perform the execution instruction operation, the user firstly touches, with the screen operation means, a region 510 of the display screen 4 where the selected information (in an example shown in FIG. 33, the selected character string 260) is displayed. The screen operation identification part 210 considers a circle 530 having a predetermined radius around a center point 520 that is the touch point touched by the screen operation means. Then, the screen operation identification part 210 sections the circle 530 into upper and lower two half circles 530a based on the center point 520 as a reference. As indicated by an arrow 550 in FIG. 33, when the touch point touched by the screen operation means on the display screen 4 is moved from the center point 520 through the upper half circle 530a to the outside of the circle 530, the screen operation identification part 210 determines that the upward sliding operation has been performed on the display screen 4. In other words, when the user slides the screen operation means from the center point 520 through the upper half circle 530a to the outside of the circle 530, the screen operation identification part 210 determines that the upward sliding operation has been performed on the display screen 4. The process execution part 200 executes the copy process corresponding to the upward sliding operation identified by the screen operation identification part 210.

On the other hand, as indicated by an arrow 560 in FIG. 33, when the touch point touched by the screen operation means on the display screen 4 is moved from the center point 520 through the lower half circle 530a to the outside of the circle 530, the screen operation identification part 210 determines that the downward sliding operation has been performed on the display screen 4. In other words, when the user slides the screen operation means from the center point 520 through the lower half circle 530a to the outside of the circle 530, the screen operation identification part 210 determines that the downward sliding operation has been performed on the display screen 4. Accordingly, the process execution part 200 executes the translation process corresponding to the downward sliding operation identified by the screen operation identification part 210.

When the screen operation means is separated away from the display screen 4 while the touch point touched by the screen operation means on the display screen 4 is not moved to the outside of the circle 530, that is, when the user terminates the sliding of the screen operation means within the circle 530, the screen operation identification part 210 determines that the execution instruction operation has not been performed on the display screen 4. In this case, the process execution part 200 does not execute the displayed information use process with use of the selected information.

In this example, similarly, when the screen operation means is separated away from the display screen 4 while the touch point touched by the screen operation means on the display screen 4 is not moved to the outside of the circle 530, the selection of the selected information may be cancelled, or the selection of the selected information may be maintained. When the selection of the selected information is cancelled, the user will newly perform the displayed information selection operation and then perform the execution instruction operation. When the selection of the selected information is maintained, the user can perform the execution instruction operation without newly performing the displayed information selection operation.

Figure 34:
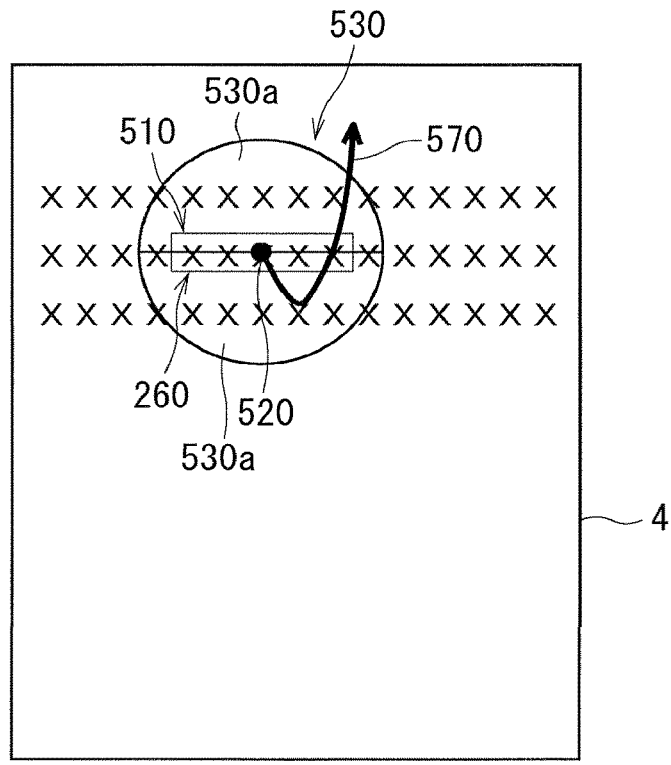
FIG. 34 is a diagram for explaining a method for identifying the execution instruction operation.

In this example, the copy process may be executed not only when the touch point touched by the screen operation means on the display screen 4 is moved from the center point 520 through the upper half circle 530a to the outside of the circle 530 but also in a case where, as indicated by an arrow 570 in FIG. 34, the touch point is once moved from the center point 520 into the lower half circle 530b and eventually moved through the upper half circle 530a to the outside of the circle 530. The sliding operation in the latter case cannot be equal to the sliding operation in the upward direction from the selected information (selected character string 260), but the screen operation identification part 210 also identifies the sliding operation in the latter case as the upward sliding operation.

Figure 35:
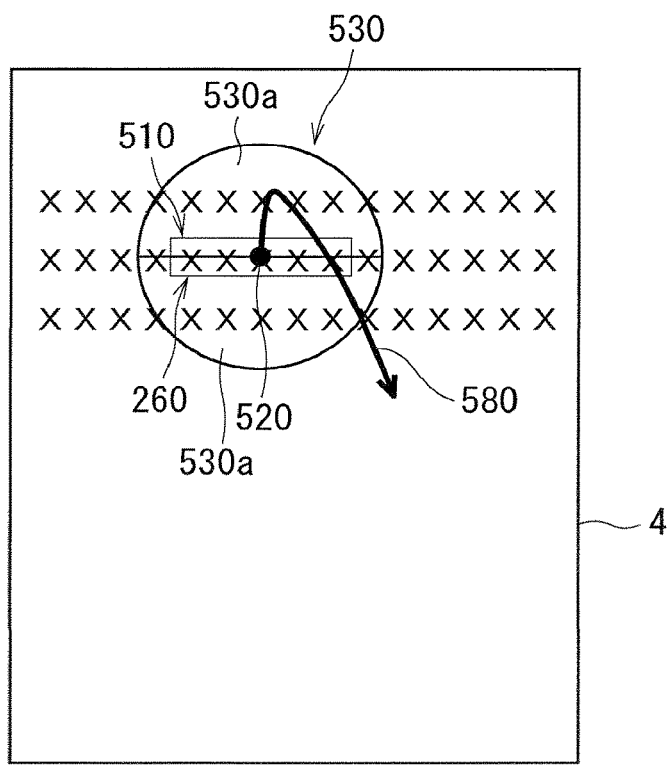
FIG. 35 is a diagram for explaining a method for identifying the execution instruction operation.

Likewise, not only in a case where the touch point touched by the screen operation means on the display screen 4 is moved from the center point 520 through the lower half circle 530a to the outside of the circle 530 but also in a case where, as indicated by an arrow 580 in FIG. 35, the touch point is once moved from the center point 520 into the upper half circle 530b and eventually moved through the lower half circle 530a to the outside of the circle 530, it can be determined that the downward sliding operation has been performed on the display screen 4, and the translation process corresponding to the downward sliding operation can be performed.

In a case where not only the sliding operations indicated by the arrows 550 and 560 in FIG. 33 but also the sliding operations indicated by the arrow 570 in FIG. 34 and the arrow 580 in FIG. 35 are identified as the execution instruction operation by the screen operation identification part 210, a track of the sliding operation within the circle 530, that is, a track of movement of the touch point touched by the screen operation means on the display screen 4 within the circle 530, is ignored. When the position of the touch point is located above the center point 520 at a time point when the touch point goes out of the circle 530, the screen operation identification part 210 identifies that the upward sliding operation has been performed. When the position of the touch point is located below the center point 520 at a time point when the touch point goes out of the circle 530, the screen operation identification part 210 identifies that the downward sliding operation has been performed. In other words, when the sliding operation in the upward direction has been performed immediately before the touch point touched by the screen operation means on the display screen 4 goes out of the circle 530, the screen operation identification part 210 determines that the upward sliding operation (execution instruction operation) has been performed, and when the sliding operation in the downward direction has been performed immediately before the touch point goes out of the circle 530, the screen operation identification part 210 determines that the downward sliding operation (execution instruction operation) has been performed.

In this manner, the displayed information use process that should be executed is determined in accordance with the direction of the sliding operation performed immediately before the touch point touched by the screen operation means on the display screen 4 goes out of the circle 530. This improves the operability of the electronic device 100.

For example, in a case where a user intending to make copying mistakenly performs the sliding operation in the downward direction from the selected information but immediately recognizes the mistake, the user can cause the electronic device 100 to execute copying by changing the direction of the sliding operation into the upward direction.

In a case where a user intending to make translation slightly performs the sliding operation in the downward direction but, on second thoughts, decides to perform copying, the user can cause the process execution part 200 to execute copying by changing the direction of the sliding operation into the upward direction.

<Third Modification>

In a case where a plurality of execution instruction operations are continuously performed on the display screen 4, the displayed information use processes corresponding to the plurality of execution instruction operations, respectively, may be continuously executed.

Figure 36:
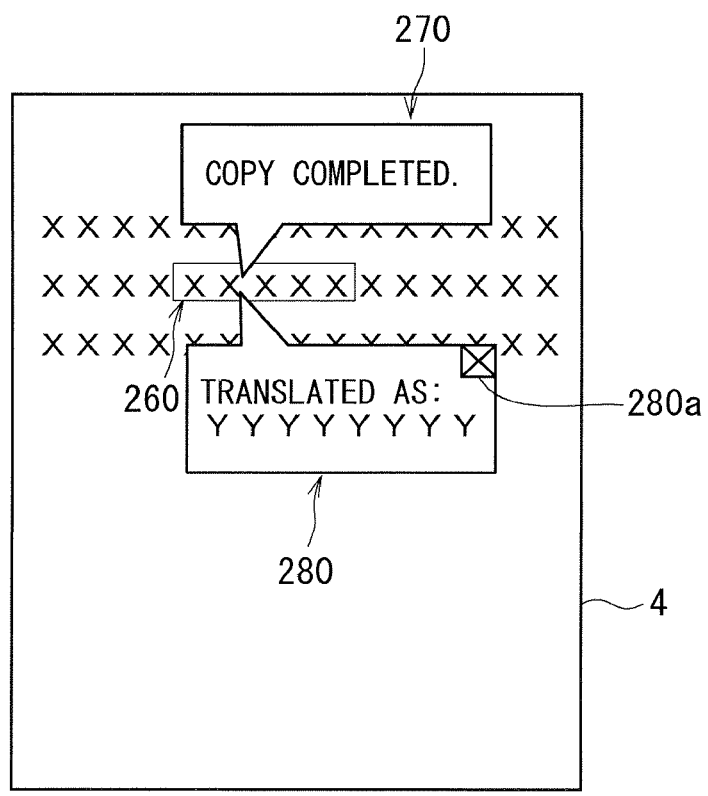
FIG. 36 is a diagram showing an exemplary display on the display screen.

For example, in a case where the correspondence table 222 shown in FIG. 7 described above is used, when the screen operation identification part 210 identifies that, subsequent to the displayed information selection operation, the upper right sliding operation and the direct downward sliding operation have been continuously performed, the process execution part 200 continuously performs the copy process and the translation process corresponding to the upper right sliding operation and the direct downward sliding operation, respectively, with use of the selected information. At this time, it is desirable that, as shown in FIG. 36, the process completion notification information 270 indicating that the copy process corresponding to the sliding operation in the upward direction is completed is displayed above the selected information (selected character string 260), and the processing result notification information 280 indicating a result of the translation process corresponding to the sliding operation in the downward direction is displayed below the selected information (selected character string 260). This facilitates intuitive understanding of which of the two sliding operations that have been continuously performed corresponds to each of the process completion notification information 270 and the processing result notification information 280 that are simultaneously displayed. That is, the information (hereinafter referred to as "process-completed displayed information") such as the process completion notification information 270 which is displayed after the completion of the displayed information use process corresponding to the sliding operation that is the execution instruction operation is positioned at a location (above or below the selected information) corresponding to the direction (upward or downward direction) of this sliding operation. Accordingly, even in a case where a plurality of kinds of process-completed displayed information are simultaneously displayed after the completion of a plurality of displayed information use processes corresponding to a plurality of execution instruction operations that are continuously executed, it is easy to identify where the process-completed displayed information corresponding to each execution instruction operation is displayed.

<Fourth Modification>

To select a vertically written character string or symbol string displayed on the display screen 4, it is necessary to move the screen operation means in the upward and downward directions. At this time, in a case where the sliding operation in the upward direction or the sliding operation in the downward direction is adopted as the execution instruction operation as described above, the displayed information selection operation and the execution instruction operation are similar to each other and they are confusing.

Figures 37, 38:
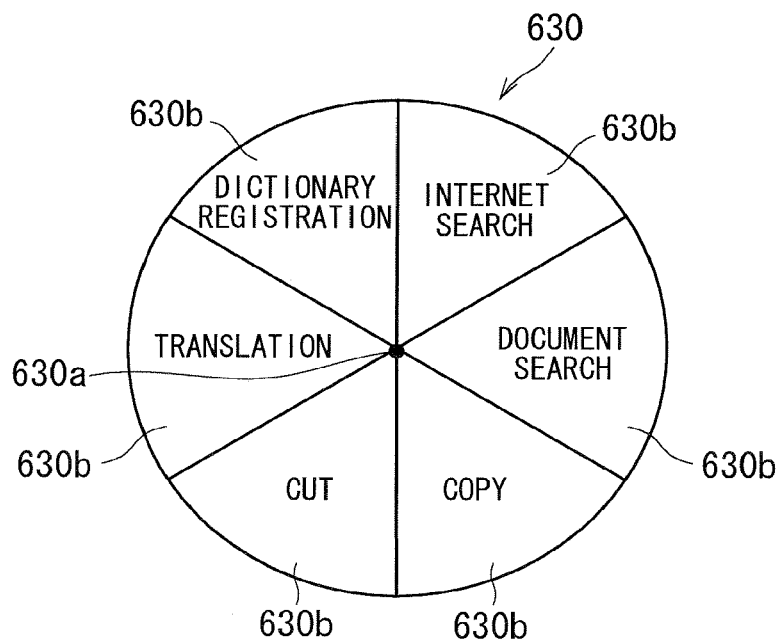
FIG. 37 is a diagram showing one example of the correspondence table.
FIG. 38 is a diagram showing one example of the correspondence table in a graphical form.

Therefore, in addition to the correspondence table 222 in which the sliding operation in the upward direction and the sliding operation in the downward direction are registered as the execution instruction operations, a correspondence table 622 is provided which is used in a case where the selected information is vertically written information. In this correspondence table 622, the sliding operation in the right direction and the sliding operation in the left direction are registered as the execution instruction operations. FIG. 37 is a diagram showing one example of the correspondence table 622.

As shown in FIG. 37, in the correspondence table 622, "copy", "document search", "Internet search", "dictionary registration", "translation", and "cut" are associated with "lower right sliding operation", "direct right sliding operation", "upper right sliding operation", "upper left sliding operation", "direct left sliding operation", and "lower left sliding operation", respectively.

Here, the "direct right sliding operation" represents an operation in which the user slides the screen operation means in the direct right direction from the selected information. The "direct left sliding operation" represents an operation in which the user slides the screen operation means in the direct left direction from the selected information.

FIG. 38, similarly to FIG. 8 described above, shows the correspondence table 622 in a graphical form by using a circle 630, for ease of visual understanding of the associated correspondence between the execution instruction operation and the displayed information use process in the correspondence table 622 shown in FIG. 37. A center point 630*a* of the circle 630 indicates the position of the selected information on the display screen 4.

As shown in FIG. 38, the circle 630 is divided into left and right two parts based on the center point 630*a* as a reference. Each of a right half circle and a left half circle is sectioned into three fan-shaped regions 630*b*. In the fan-shaped region 630*b* located lower right of the center point 630*a* (the position of the selected information), a character string "copy" is shown. From this, it is understood that the lower right sliding operation is associated with the process for copying the selected information.

In the fan-shaped region 630*b* located direct right of the center point 630*a* (the position of the selected information), a character string "document search" is shown. From this, it is understood that the direct right sliding operation is associated with the document search for searching a document indicating the selected information for this selected information.

In the fan-shaped region 630*b* located upper right of the center point 630*a* (the position of the selected information), a character string "Internet search" is shown. From this, it is understood that the upper right sliding operation is associated with the Internet search for searching the Internet for the selected information by using the search site.

In the fan-shaped region 630*b* located upper left of the center point 630*a* (the position of the selected information), a character string "dictionary registration" is shown. From this, it is understood that the upper left sliding operation is associated with the process for registering the selected information in the dictionary.

In the fan-shaped region 630*b* located direct left of the center point 630*a* (the position of the selected information), a character string "translation" is shown. From this, it is understood that the direct left sliding operation is associated with the process for translating the selected information.

In the fan-shaped region 630*b* located lower left of the center point 630*a* (the position of the selected information), a character string "cut" is shown. From this, it is understood that the lower left sliding operation is associated with the process for cutting the selected information from the document indicating this selected information.

In a case where the selected information is a vertically written character string and in a case where the selected information is a vertically written symbol string, the process execution part 200 refers to the correspondence table 622, to execute the displayed information use process in accordance with the execution instruction operation identified by the screen operation identification part 210.

On the other hand, in a case where the selected information is other than a vertically written character string and in a case where the selected information is other than a vertically written symbol string, the process execution part 200 refers to the correspondence table 222 in the above described manner, to execute the displayed information use process in accordance with the execution instruction operation identified by the screen operation identification part 210.

Next, a description will be given to a sequence of operations of the electronic device 100 in a time period from when the displayed information selection operation for selecting a vertically written character string displayed on the objective display screen 4 is performed to when the displayed information use process with use of this character string is executed.

Figure 39:
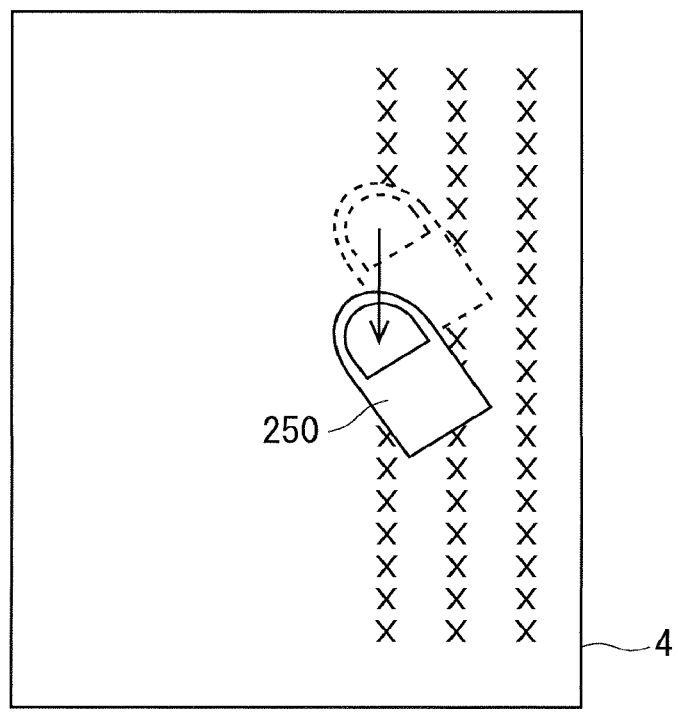
FIG. 39 is a diagram showing a situation where the user selects a vertically written character string.
Figure 40:
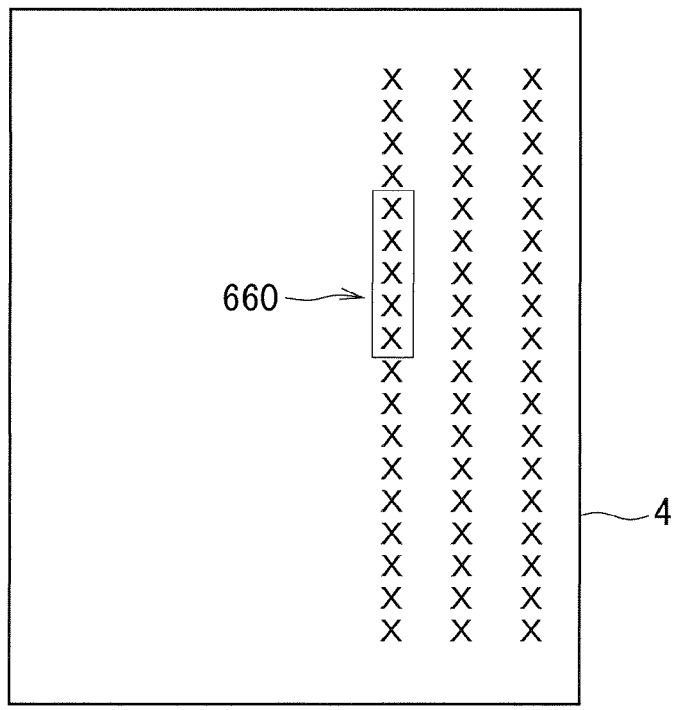
FIG. 40 is a diagram showing an exemplary display on the display screen after the vertically written character string is selected.

FIG. 39 is a diagram showing a situation where the user selects the vertically written character string. As shown in FIG. 39, when the user traces, with his/her finger 250, a region of the objective display screen 4 where a vertically written character string that is a selection object is displayed in the downward direction and then separates the finger 250 away from the objective display screen 4, the screen operation identification part 210 identifies that the displayed information selection operation for selecting this character string has been performed on the objective display screen 4. Thus, on the objective display screen 4, as shown in FIG. 40, the selected character string 660 (hereinafter referred to as "selected character string 660") that is the selected information is highlighted (emphasized).

Figure 41:
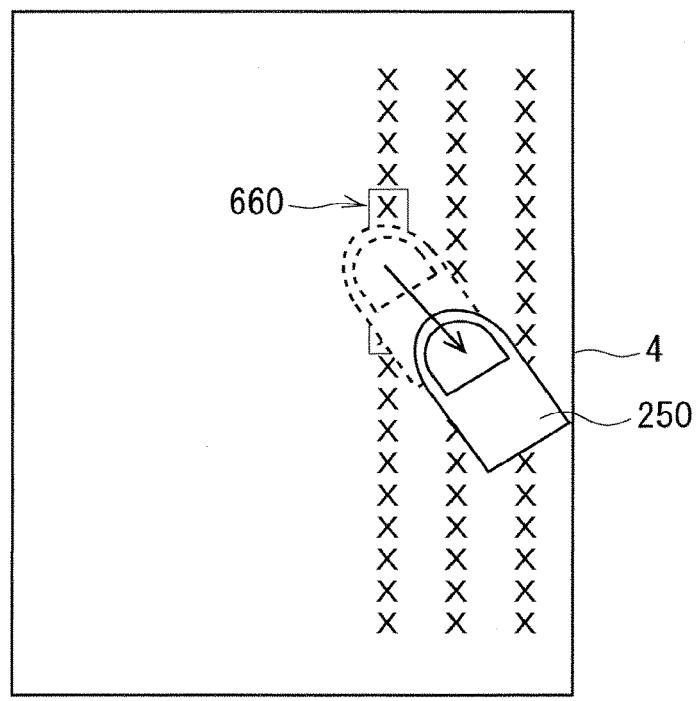
FIG. 41 is a diagram showing a situation where the user performs the execution instruction operation.
Figure 42:
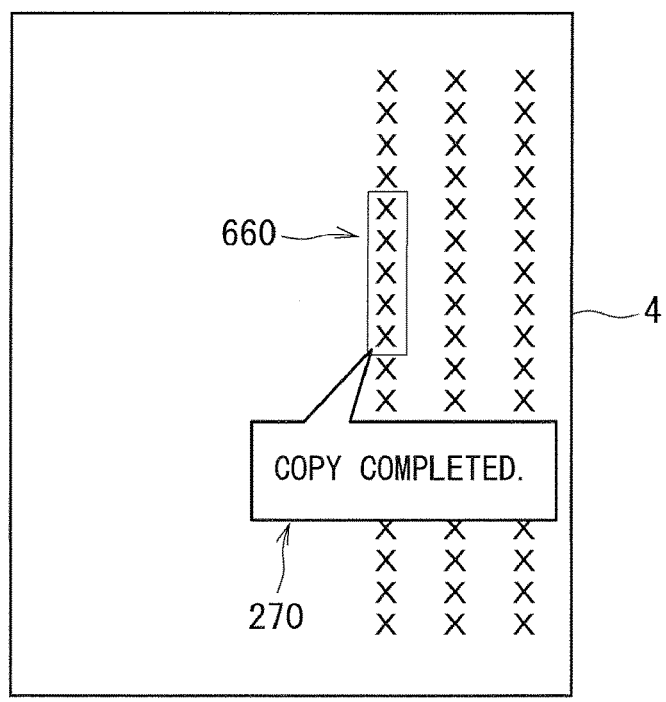
FIG. 42 is a diagram showing an exemplary display on the display screen after the execution instruction operation is performed.

In a case where, subsequent to the displayed information selection operation, the user slides his/her finger 250 in the lower right direction from the selected character string 660 while his/her finger 250 is touching the objective display screen 4 as shown in FIG. 41, the screen operation identification part 210 identifies that, subsequent to the displayed information selection operation, the lower right sliding operation has been performed on the objective display screen 4. Thus, the process execution part 200 refers to the correspondence table 622, to execute the displayed information use process corresponding to the lower right sliding operation with use of the selected character string 660. To be specific, the process execution part 200 copies the selected character string 660 and stores the copy in the storage part 22. Then, as shown in FIG. 42, the process completion notification information 270 indicating that the copy process is completed is displayed on the objective display screen 4.

FIG. 43 is a diagram showing a situation where, subsequent to the displayed information selection operation, the user performs the direct left sliding operation on the objective display screen 4. In a case where, subsequent to the displayed information selection operation, the user slides his/her finger 250 in the direct left direction from the selected character string 660 while his/her finger 250 is touching the objective display screen 4 as shown in FIG. 43, the screen operation identification part 210 identifies that, subsequent to the displayed information selection operation, the direct left sliding operation has been performed on the objective display screen 4. Thus, the process execution part 200 refers to the correspondence table 622, to execute the displayed information use process corresponding to the direct left sliding operation with use of the selected character string 660. To be specific, the process execution part 200 translates the selected character string 660 into English. Then, as shown in FIG. 44, the processing result notification information 280 indicating a processing result of the translation process and the display erase button 280a are displayed on the objective display screen 4. When the display erase button 280a is operated by the user, the display of the processing result notification information 280 is erased from the objective display screen 4.

In the method for identifying the execution instruction operation described above with reference to FIG. 24, it is possible to identify the execution instruction operation in the same manner even in a case where the selected information is vertically written information, by dividing the circle 330 into left and right two parts and sectioning each of a right half circle and a left half circle into three fan-shaped regions 330a.

Figures 45, 46:
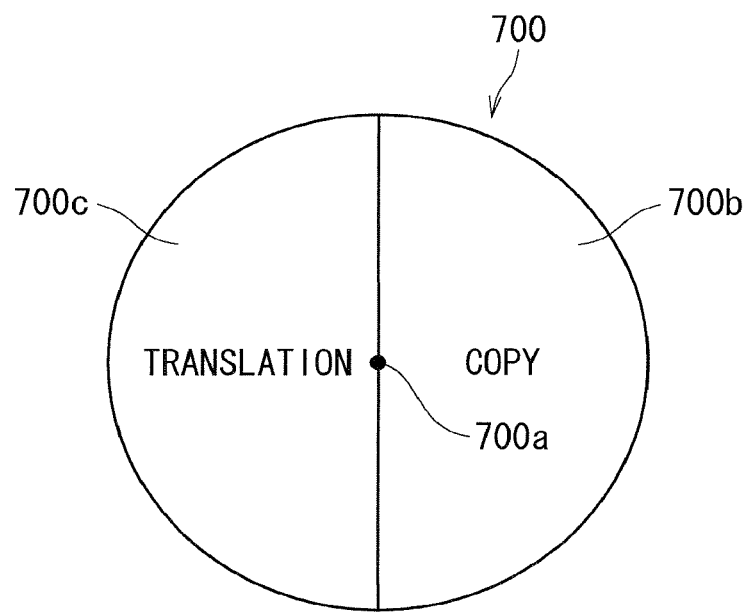
FIG. 45 is a diagram showing one example of the correspondence table.
FIG. 46 is a diagram showing one example of the correspondence table in a graphical form.

In a case of using the correspondence table 222 shown in FIG. 31 described above, the correspondence table 622 is configured as shown in FIG. 45. In the correspondence table 622 shown in FIG. 45, "copy" and "right sliding operation" are associated with each other, and "translation" and "left sliding operation" are associated with each other. Here, the "right sliding operation" represents an operation in which the user slides the screen operation means in the right direction from the selected information. The "left sliding operation" represents an operation in which the user slides the screen operation means in the left direction from the selected information.

FIG. 46, similarly to FIG. 32 described above, shows the correspondence table 222 in a graphical form by using a circle 700, for ease of visual understanding of the associated correspondence between the execution instruction operation and the displayed information use process in the correspondence table 622 shown in FIG. 45. A center point 700a of the circle 700 indicates the position of the selected information on the display screen 4.

As shown in FIG. 46, the circle 700 is divided into left and right two parts based on the center point 700a as a reference. In a half circle 700b located to the right of the center point 700a (the position of the selected information), a character string "copy" is shown. In a half circle 700c located to the left of the center point 700a (the position of the selected information), a character string "translation" is shown. From this, it is understood that the right sliding operation is associated with the process for copying the selected information, and the left sliding operation is associated with the process for translating the selected information.

In a case of using the correspondence table 622 shown in FIG. 45 when the selected information is vertically written information, it is possible to identify the execution instruction operation by the method for identifying the execution instruction operation described above with reference to FIG. 33, by dividing the circle 530 into left and right two parts.

In a case of using the correspondence table 622 shown in FIG. 45, as described above with reference to FIGS. 34 and 35, the displayed information use process that should be executed may be determined in accordance with the direction (the right direction or the left direction) of the sliding operation performed immediately before the touch point touched by the screen operation means on the display screen 4 goes out of the circle 530.

It may be acceptable that only the sliding operation in the upward direction or only the sliding operation in the downward direction is registered in the correspondence table 222. For example, in the correspondence table 222 shown in FIG. 7, only the upper right sliding operation, the direct upward sliding operation, and the upper left sliding operation may be registered, or only the lower left sliding operation, the direct downward sliding operation, and the lower right sliding operation may be registered. Additionally, in the correspondence table 222 shown in FIG. 31, only the upward sliding operation may be registered or only the downward sliding operation may be registered.

Moreover, it may be also acceptable that only the sliding operation in the right direction or only the sliding operation in the left direction is registered in the correspondence table 622. For example, in the correspondence table 622 shown in FIG. 37, only the lower right sliding operation, the direct right sliding operation, and the upper right sliding operation may be registered, or only the upper left sliding operation, the direct left sliding operation, and the lower left sliding operation may be registered. In the correspondence table 622 shown in FIG. 45, only the right sliding operation may be registered, or only the left sliding operation may be registered.

In a case of adopting the flick operation as the execution instruction operation, in the correspondence table 222, only the flick operation in the upward direction or only the flick operation in the downward direction may be registered, and in the correspondence table 622, only the flick operation in the right direction or only the flick operation in the left direction may be registered.

<Fifth Modification>

In the electronic device 100, it may be acceptable that, when the screen operation identification part 210 identifies that the displayed information selection operation has been performed on the display screen 4, in other words, when the screen operation identification part 210 determines that the displayed information selection operation on the display screen 4 is completed, then the display control part 204 controls the display part 3 including this display screen 4 to display the correspondence table 222 on the display screen 4.

For example, the display control part 204 forms a graphic of the correspondence table 222 similarly to the above-described graphic shown in FIG. 8, and, when the displayed information selection operation is performed on the display screen 4, displays a resulting graphic 800 on display screen 4 as shown in FIG. 47. Then, when the execution instruction operation is performed on the display screen 4, the display control part 204 erases the graphic 800 from the display screen 4.

In a case of using the correspondence table 622, the display control part 204 forms a graphic of the correspondence table 622 similarly to the above-described graphic shown in FIG. 38, and, when the displayed information selection operation is performed on the display screen 4, displays a resulting graphic 810 on the display screen 4 as shown in FIG. 48. Then, when the execution instruction operation is performed on the display screen 4, the display control part 204 erases the graphic 810 from the display screen 4.

In this manner, when information displayed on the display screen 4 is selected, the correspondence table 222 or 622 is displayed on the display screen 4 without requiring an instruction from the user. Thereby, the user can easily perform the execution instruction operation. At this time, as shown in FIGS. 47 and 48, the correspondence table 222 or 622 is displayed on the display screen 4 such that it does not overlap the information (selected character string 260 or 660) selected by the user. Thereby, the user can perform the desired execution instruction operation while checking the selected information. It may be also acceptable that, in a case where the correspondence table 222 or 622 is displayed so as to overlap the information selected by the user, the correspondence table 222 or 622 (in more detail, the graphic 800 or 810) is displayed in a translucent manner such that the information selected by the user is visible. In this case as well, the user can perform the desired execution instruction operation while checking the selected information.

<Sixth Modification>

In the example described above, at the time point when, after the region of the display screen 4 where the selection object information is displayed is traced with the screen operation means, the screen operation means is separated away from the display screen 4, the screen operation identification part 210 determines that the displayed information selection operation is completed. However, the determination that the displayed information selection operation is completed may be made based on other criteria.

For example, it may be possible that the screen operation identification part 210 determines that the displayed information selection operation is completed, in a case where, after the region of the display screen 4 where the selection object information is displayed is traced with the screen operation means, such a situation is detected that the screen operation means continuously keeps touching the display screen 4 for a certain time period or longer in a terminating point of the tracing, that is, in a position at which the movement of the screen operation means is stopped. Then, when the screen operation identification part 210 determines that the displayed information selection operation is completed, the correspondence table 222 or 622 may be displayed on the display screen 4 as described above.

In this manner, in a case where, after the region of the display screen 4 where the selection object information is displayed is traced with the screen operation means, the screen operation means continuously keeps touching the display screen 4 in the terminating point for a certain time period or more, the displayed information selection operation determines the completion. Thereby, even when the user traces, with the screen operation means, the region of the display screen 4 where the selection object information is displayed and then separates the screen operation means away from the display screen 4, the user can re-select information displayed on the display screen 4, as long as the screen operation means does not continuously keep touching the display screen 4 for the certain time period or longer in the position at which the movement of the screen operation means is stopped. This further improves the operability of the electronic device 100.

<Seventh Modification>

Figure 49:
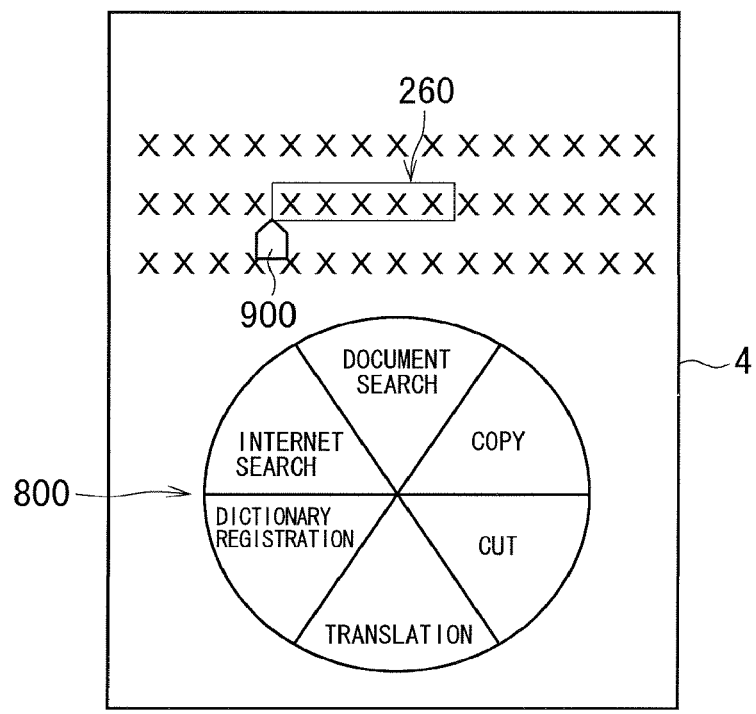
FIG. 49 is a diagram showing an exemplary display in the electronic device.

FIGS. 49 to 52 are diagrams showing an exemplary display in the electronic device 100 according to this modification. In this modification, when the displayed information selection operation is performed on the display screen 4, as shown in FIG. 49, an edit object 900 for edition of a selection range is displayed under the head of the selected character string 260. At this time, as shown in FIG. 49, the graphic 800 representing the correspondence table 222 may be displayed on the display screen 4.

In a state shown in FIG. 49, when the user performs the execution instruction operation on the display screen 4, the displayed information use process associated with this execution instruction operation in the correspondence table 222 is executed with use of the selected character string 260. On the other hand, when the user touches the edit object 900 with the screen operation means, the edition of a displayed information selection range is allowed in the electronic device 100, and, as shown in FIG. 50, the graphic 800 representing the correspondence table 222 is erased from the display screen 4.

Figure 50:
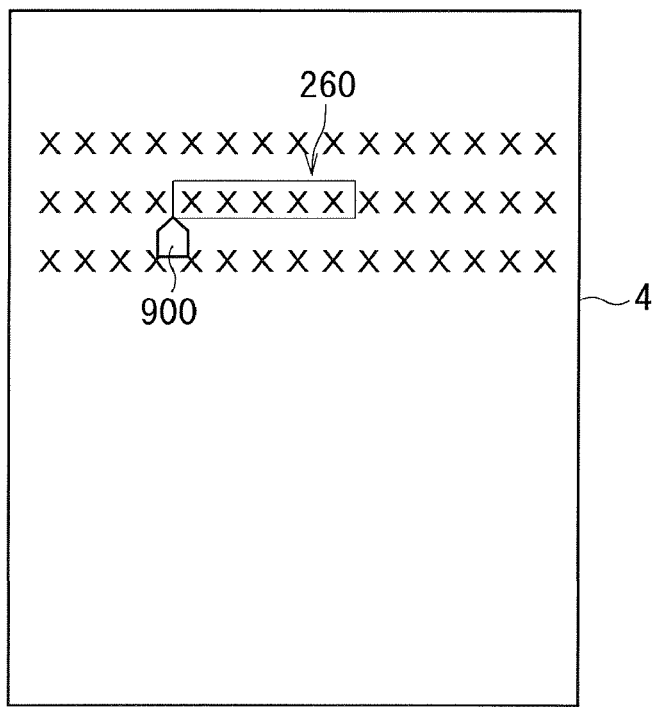
FIG. 50 is a diagram showing an exemplary display in the electronic device.

In a state shown in FIG. 50, by moving the screen operation means in touch with the edit object 900 in the right direction or the left direction while the screen operation means is touching the display screen 4, the user can change a character string selection range based on a position of the edit object 900 as a starting point.

Figure 51:
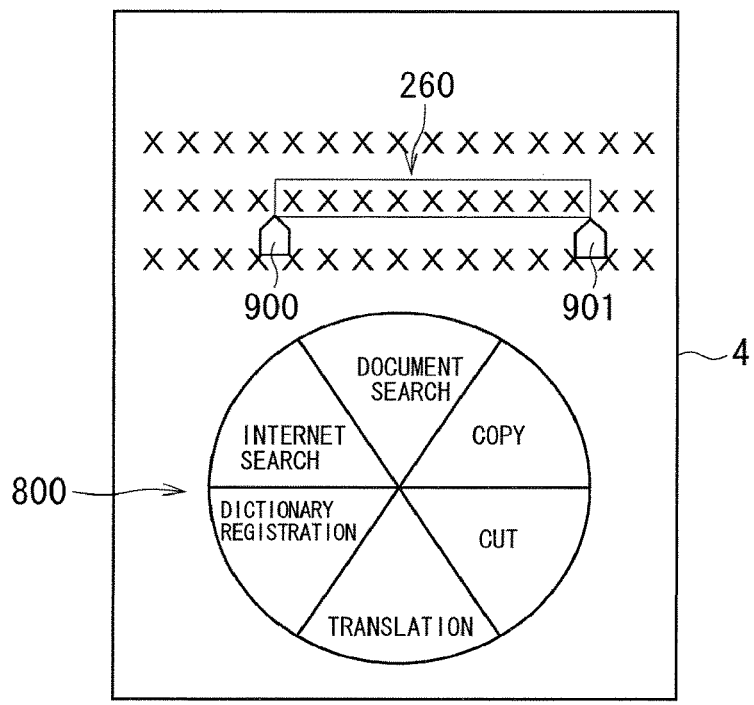
FIG. 51 is a diagram showing an exemplary display in the electronic device.

FIG. 51 is a diagram showing a situation where the user has changed a rear position of the selected character string 260, by moving the screen operation means in touch with the edit object 900 in the right direction while the screen operation means is touching the display screen 4. As shown in FIG. 51, in a case where the screen operation means is moved in the right direction from the edit object 900, the edit object 900 is displayed under the head of the selected character string 260 and another edit object 901 is displayed under the end of the selected character string 260. That is, a character string sandwiched between the two edit objects 900 and 901 is the selected character string 260. At this time, the graphic 800 representing the correspondence table 222 is displayed again. When, in a state shown in FIG. 51, the user performs the execution instruction operation on the display screen 4, the displayed information use process associated with this execution instruction operation in the correspondence table 222 is executed with use of the selected character string 260.

Figure 52:
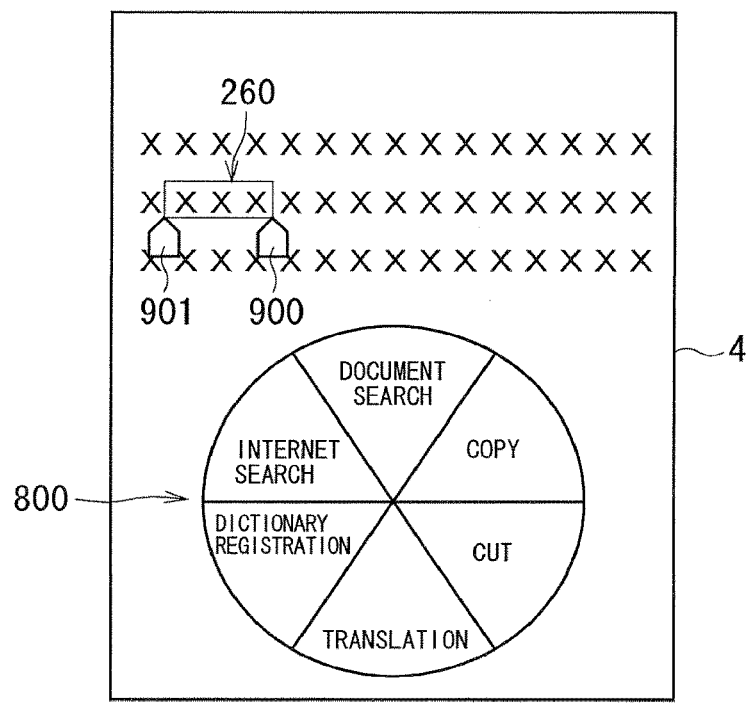
FIG. 52 is a diagram showing an exemplary display in the electronic device.

FIG. 52 is a diagram showing a situation where the user has changed a head position of the selected character string 260, by moving the screen operation means in touch with the edit object 900 in the left direction while the screen operation means is touching the display screen 4. As shown in FIG. 52, in a case where the screen operation means is moved in the left direction from the edit object 900, the edit object 900 is displayed under the end of the selected character string 260 and another edit object 901 is displayed under the head of the selected character string 260. That is, a character string sandwiched between the two edit objects 900 and 901 is the selected character string 260. At this time, the graphic 800 representing the correspondence table 222 is displayed again. When, in a state shown in FIG. 52, the user performs the execution instruction operation on the display screen 4, the displayed information use process associated with this execution instruction operation in the correspondence table 222 is executed with use of the selected character string 260.

In a case where the electronic device 100 is brought into the state shown in FIG. 51 or 52, the user is allowed to move the edit objects 900 and 901 in the right direction and the left direction by using the screen operation means. When the screen operation means in touch with the edit object 900 is slid in the right direction or the left direction, the edit object 900 is moved in this sliding direction. Likewise, when the screen operation means in touch with the edit object 901 is slid in the right direction or the left direction, the edit object 901 is moved in this sliding direction. The user can change a range of the selected character string 260, by move at least one of the edit objects 900 and 901.

<Other Modifications>

Although, in the preferred embodiment and its modifications described above, a case where the invention of the present application is applied to a mobile phone has been illustrated. However, the invention of the present application is applicable to electronic devices different from mobile phones.

The invention of the present application is also applicable to an electronic device in which, unlike the above-described electronic device 100, a plurality of display screens are simultaneously visible at any time. Moreover, the invention of the present application is also applicable to an electronic device in which a plurality of display screens are simultaneously visible in an open state but all of the plurality of display screens are not visible in a closed state. The invention of the present application is applicable to, for example, a flip-type mobile phone or a note-type personal computer having two housings that are provided with display screens on the inner surfaces thereof and that can be overlapped each other to thereby fold the flip-type mobile phone or the note-type personal computer. Furthermore, the invention of the present application is also applicable to an electronic device having only one display screen unlike the above-described electronic device 100.

While the invention has been shown and described in detail, the foregoing description is in all aspects illustrative and not restrictive. It is therefore understood that numerous modifications and variations can be devised without departing from the scope of the invention.

I claim:

1. An electronic device comprising:
a touch panel comprising a display screen; and
at least one processor configured to
receive a selection of displayed information on the display screen,
subsequent to receiving the selection of displayed information, identify at least two of a plurality of execution-instruction operations that are performed on the display screen, wherein the at least two execution-instruction operations are continuously performed,
identify at least two processes associated with the at least two identified execution-instruction operations in stored correspondence information, wherein the correspondence information associates each of the plurality of execution-instruction operations with a different one of a plurality of processes, wherein the plurality of processes comprise registration of information in a dictionary and at least two of copying of information, cutting of information, translation of information, and search for information, and
execute the at least two identified processes using the selected displayed information.

2. The electronic device according to claim 1, wherein the at least two execution-instruction operations comprise a touch operation that originates at a location corresponding to the selected displayed information and moves to at least two different ones of a plurality of sections of a region continuously surrounding the origination location.

3. The electronic device according to claim 1, wherein the plurality of processes comprise copying of information, cutting of information, translation of information, search for information, and registration of information in a dictionary.

4. The electronic device according to claim 1, wherein each of the plurality of execution-instruction operations comprises a slide or a flick.

5. The electronic device according to claim 1, wherein the at least one processor is further configured to, when the selection of displayed information has been received, display a representation of the correspondence information on the display screen.

6. The electronic device according to claim 1, wherein each of the plurality of execution-instruction operations comprises a touch input that originates at a location corresponding to the selected displayed information and moves into a different one of a plurality of sections of a region surrounding the origination location, wherein the plurality of sections of the region are never visually represented while the at least two identified execution-instruction operations are performed.

7. The electronic device according to claim 6, wherein the region surrounding the origination location is a circular region, wherein the plurality of sections of the circular region cover the entire circular region, and wherein each of the plurality of sections of the circular region corresponds to a different one of the plurality of execution-instruction operations, such that each of the plurality of sections of the circular region corresponds to a different one of the plurality of processes in the correspondence information.

8. The electronic device according to claim 1, wherein the at least one processor executes a display process of information indicating the completion of the at least two identified processes on the display screen when the at least two identified processes have completed after executing the at least two identified processes.

9. A method comprising using at least one processor to:
- receive a selection of displayed information on a display screen;
- subsequent to receiving the selection of displayed information, identify at least two of a plurality of execution-instruction operations that are performed on the display screen, wherein the at least two execution-instruction operations are continuously performed;
- identify at least two processes associated with the at least two identified execution-instruction operations in stored correspondence information, wherein the correspondence information associates each of the plurality of execution-instruction operations with a different one of a plurality of processes, wherein the plurality of processes comprise registration of information in a dictionary and at least two of copying of information, cutting of information, translation of information, and search for information; and
- execute the at least two identified processes using the selected displayed information.

10. A non-transitory computer-readable storage medium having instructions stored thereon, wherein the instructions, when executed by a processor, cause the processor to:
- receive a selection of displayed information on a display screen;
- subsequent to receiving the selection of displayed information, identify at least two of a plurality of execution-instruction operations that are performed on the display screen, wherein the at least two execution-instruction operations are continuously performed;
- identify at least two processes associated with the at least two identified execution-instruction operations in stored correspondence information, wherein the correspondence information associates each of the plurality of execution-instruction operations with a different one of a plurality of processes, wherein the plurality of processes comprise copying of information, cutting of information, translation of information, search for information, and registration of information in a dictionary; and
- execute the at least two identified processes using the selected displayed information.

* * * * *